(12) United States Patent
Sun

(10) Patent No.: US 12,523,030 B2
(45) Date of Patent: Jan. 13, 2026

(54) TOILET FOAM APPARATUS

(71) Applicant: Kohler (China) Investment Co., Ltd., Shanghai (CN)

(72) Inventor: Junfeng Sun, Shanghai (CN)

(73) Assignee: Kohler (China) Investment Co., Ltd., Shanghai (CN)

( * ) Notice: Subject to any disclaimer, the term of this patent is extended or adjusted under 35 U.S.C. 154(b) by 168 days.

(21) Appl. No.: 17/978,747

(22) Filed: Nov. 1, 2022

(65) Prior Publication Data

US 2023/0151601 A1    May 18, 2023

(30) Foreign Application Priority Data

| Nov. 16, 2021 | (CN) | ......................... 202111357210.2 |
| Nov. 16, 2021 | (CN) | ......................... 202122811574.5 |
| Nov. 16, 2021 | (CN) | ......................... 202122811575.X |
| Nov. 16, 2021 | (CN) | ......................... 202122812436.9 |

(51) Int. Cl.
    *E03D 9/03*     (2006.01)
    *E03D 9/02*     (2006.01)

(52) U.S. Cl.
    CPC ........ *E03D 9/037* (2013.01); *E03D 2009/028* (2013.01)

(58) Field of Classification Search
    CPC ......................... E03D 9/037; E03D 2009/028
    USPC ......................................... 4/222–224, 300.3
    See application file for complete search history.

(56) References Cited

FOREIGN PATENT DOCUMENTS

| CN | 201078021 Y | 6/2008 | |
| CN | 111877487 A | 11/2020 | |
| GB | 2503352 A * | 12/2013 | ............... E03D 9/08 |
| JP | 2017066639 A | 4/2017 | |
| JP | 2018155082 A | 10/2018 | |
| KR | 200360137 Y1 * | 8/2004 | ....... E03D 2009/028 |
| KR | 200479010 Y1 | 12/2015 | |
| WO | 2017169221 A1 | 10/2017 | |

OTHER PUBLICATIONS

Chinese Office Action from Chinese Patent Application No. 202111357210.2, dated Sep. 4, 2023, 9 pages. (including English summary).

* cited by examiner

*Primary Examiner* — Tuan N Nguyen
(74) *Attorney, Agent, or Firm* — Lempia Summerfield Katz LLC

(57) ABSTRACT

A toilet foam generating mechanism includes: a foam generating cavity, including a foam outlet; a foam spray nozzle in communication with the foam outlet; and a foaming liquid adding passage in communication with the foam generating cavity. The foaming liquid adding passage includes: a foaming liquid chamber; and a liquid suction device, including a first end in communication with the foaming liquid chamber and a second end in communication with the foam generating cavity. The liquid suction device is electrically coupled to a first switching power supply. A control method for spraying foam by a toilet includes determining a current usage scenario of the toilet; determining a foam mode associated with the current usage scenario as a current foam mode according to the current usage scenario of the toilet; and executing the current foam mode.

14 Claims, 11 Drawing Sheets

TOILET FOAM APPARATUS

CROSS REFERENCE TO RELATED APPLICATION

This application claims the benefit of priority to: Chinese Patent Application No. 202122812436.9 filed in the Chinese Intellectual Property Office on Nov. 16, 2021, which is hereby incorporated by reference in its entirety; Chinese Patent Application No. 202122811575.X filed in the Chinese Intellectual Property Office on Nov. 16, 2021, which is hereby incorporated by reference in its entirety; Chinese Patent Application No. 202111357210.2 filed in the Chinese Intellectual Property Office on Nov. 16, 2021, which is hereby incorporated by reference in its entirety; and Chinese Patent Application No. 202122811574.5 filed in the Chinese Intellectual Property Office on Nov. 16, 2021, which is hereby incorporated by reference in its entirety.

FIELD

The present disclosure relates to the technical field of sanitary devices, in particular to a toilet foam generating mechanism and a toilet. The present disclosure also relates to the technical field of sanitary devices, in particular to a toilet foam generating mechanism with adjustable foam size and a toilet. The present disclosure also relates to the related technical field of sanitary devices, in particular to a control method for spraying foam by a toilet, an electronic device and a storage medium. The present disclosure also relates to the technical field of sanitary devices, in particular to a toilet foam generating mechanism with adjustable foam range and a toilet.

BACKGROUND

A toilet is internally provided with a foaming device which foams and then sprays a foaming liquid onto a toilet surface to isolate sewage in the toilet from air through foam, thus preventing water-sealed sewage from splashing upwardly. After the toilet is used, the toilet is flushed to discharge the foam and ordure out of the toilet.

However, after the existing foaming device is not used for a long time, an interior of the foaming device may dry up, which causes the solidification of a foaming solution in a liquid pump and thus causes the failure of the pump.

In addition, when the foaming liquid is placed in a high position, the foaming liquid may "drool" onto a component in a low position, such as a water tank or a ceramic. That is, a fluid of the foaming liquid may flow microscopically without a pre-pressure, such as one drop every three days.

The toilet with the foaming device may have another technical problem.
The toilet foaming device can only spray a small-sized foam onto the toilet, and a foam spraying time is in the scenarios of "before the toilet is used" and "after the toilet is used". In each scenario, the toilet uses the same small-sized foam.

However, according to the research, under a specific experiment, the foaming liquid needed by the small-sized foam is about 0.7 g, and the foaming liquid needed by a large-sized foam is about 0.3 g. Therefore, the small-sized foam needs more foaming liquid than the large-sized foam.

Moreover, from the view of the toilet demand:
spraying foams "after the toilet is used" requires the foams to have a long life, thereby isolating the sewage in the toilet from the air, and the small-sized foam can cope with this case;
whereas, spraying foams "before the toilet is used" is mainly to prevent water-sealed sewage from splashing upwardly, and after the toilet is used, the toilet is flushed to discharge the foam and ordure out of the toilet, so the foam life is not required, and in this case, the large-sized foam may be used.

Therefore, the prior art only uses the foam of one size, which may lead to the waste of the foaming liquid.

The toilet with the foaming device may have another technical problem. The current toilet foaming device sprays small-sized foams onto the toilet and sprays the foams onto a ceramic surface through a dispersing device. However, because the whole ceramic surface is large and the foam range is fixed, the foams cannot be sprayed in some parts of the ceramic surface or the foams are sprayed out of the ceramic surface.

SUMMARY

It is necessary to provide a toilet foam generating mechanism and a toilet solving the technical problem that a foaming device in a toilet in the prior art may dry up when not used for a long time, resulting in failure of a pump.

The present disclosure provides a toilet foam generating mechanism. The toilet foam generating mechanism comprises a foaming liquid adding passage, a water adding passage, an air inlet channel, a foam generating cavity, and a foam spray nozzle. The foaming liquid adding passage, the water adding passage, and the air inlet channel are communicated with the foam generating cavity. The foam spray nozzle is communicated with a foam outlet of the foam generating cavity. The foaming liquid adding passage comprises a foaming liquid box (e.g., a foaming liquid chamber) and a liquid suction device. The foaming liquid box is communicated with the liquid suction device through a first liquid suction pipeline. The liquid suction device is communicated with the foam generating cavity through a second liquid suction pipeline. The first liquid suction pipeline is provided with a first valve. The second liquid suction pipeline is provided with a second valve.

In another embodiment, the first valve is a pressure valve, and the second valve is a pressure valve.

In another embodiment, the liquid suction device is a liquid pump.

In another embodiment, the water adding passage comprises a water tank, a water adding device, a first water adding pipeline, and a second water adding pipeline. The water tank is communicated with the foam generating cavity through the first water adding pipeline, the water adding device, and the second water adding pipeline in sequence.

In another embodiment, the second water adding pipeline is provided with a third valve.

In another embodiment, the water adding device is a water pump.

In another embodiment, the toilet foam generating mechanism further comprises a foam refining device, wherein the foam spray nozzle is communicated with the foam outlet through the foam refining device.

In another embodiment, the foam refining device is a dispensing motor.

In another embodiment, the air inlet channel comprises an air input device communicated with the foam generating cavity through an air inlet pipeline, and the air inlet pipeline is provided with a fourth valve.

The present disclosure provides a toilet, which comprises a toilet body and the toilet foam generating mechanism as mentioned above. The toilet foam generating mechanism is fixed in the toilet body, and the foam spray nozzle faces a toilet surface.

According to the present disclosure, the valves are arranged on the first liquid suction pipeline and the second liquid suction pipeline, and the liquid suction device communicated with the first liquid suction pipeline and the second liquid suction pipeline is sealed through the valves. Thus, the fluid in the liquid suction device is completely isolated from the outside when not in use, and thus drying up may be avoided. Meanwhile, the valves are additionally arranged in various fluid passages, and the passages are stably blocked under actions of the valves, and thus the possibility of "drooling" may be avoided.

It is also necessary to provide a toilet foam generating mechanism with adjustable foam size and a toilet solving the technical problem that the foaming liquid is wasted due to the single size of the foams sprayed by the foaming device in the toilet in the prior art.

The present disclosure provides a toilet foam generating mechanism with adjustable foam size. The toilet foam generating mechanism with adjustable foam size comprises: a foaming liquid adding passage, a water adding passage, an air inlet channel, a foam generating cavity, a foam spray nozzle, and a controller. The foaming liquid adding passage, the water adding passage, and the air inlet channel are communicated with the foam generating cavity. The foam spray nozzle is communicated with a foam outlet of the foam generating cavity. The foaming liquid adding passage comprises a foaming liquid box and a liquid suction device. One end of the liquid suction device is communicated with the foaming liquid box and the other end is communicated with the foam generating cavity. A power supply end of the liquid suction device is electrically connected with a first switching power supply. The controller is communicated with the first switching power supply.

In another embodiment, the first switching power supply is a pulse width modulation power supply.

In another embodiment, the liquid suction device is a liquid pump.

In another embodiment, the water adding passage comprises a water tank and a water adding device. One end of the water adding device is communicated with the water tank and the other end is communicated with the foam generating cavity.

In another embodiment, the water adding device is a water pump.

In another embodiment, a power supply end of the water adding device is electrically connected with a second switching power supply, and the controller is communicated with the second switching power supply.

In another embodiment, the air inlet channel comprises an air input device communicated with the foam generating cavity.

In another embodiment, the air input device is an air pump.

In another embodiment, a power supply end of the air input device is electrically connected with a third switching power supply, and the controller is communicated with the third switching power supply.

The present disclosure provides a toilet, comprising a toilet body and the toilet foam generating mechanism with adjustable foam size as described above. The toilet foam generating mechanism with adjustable foam size is fixed in the toilet body and the foam spray nozzle faces a toilet surface.

According to the present disclosure, the first switching power supply is controlled through the controller. Thus, by changing the supplied power of the liquid suction device, a volume of a foaming liquid pumped into the foam generating cavity may be changed by the liquid suction device, and then the size of the generated foam may be changed. Therefore, foam structures with various sizes can be produced, and without affecting the use function, large foams are partially used instead of small foams. Thus, the foaming liquid may be saved and the maintenance frequency may be reduced.

It is also necessary to provide a control method for spraying foam by a toilet, an electronic device and a storage medium solving the technical problem that the foaming device in the toilet in the prior art uses the foam of one size in different usage scenarios, resulting in the waste of the foaming liquid.

The present disclosure provides a control method for spraying foam by a toilet. The control method comprises:
  determining a current usage scenario of the toilet;
  determining a foam mode associated with the current usage scenario as a current foam mode according to the current usage scenario of the toilet; and
  executing the current foam mode.

In another embodiment, the foam mode comprises a first foam mode, a second foam mode, and/or a third foam mode. A mean diameter of foams generated when the first foam mode is executed is less than or equal to a mean diameter of foams generated when the second foam mode is executed. No foams are sprayed when the third foam mode is executed.

In another embodiment, determining the foam mode associated with the current usage scenario according to the current usage scenario of the toilet specifically comprises:
  if the current usage scenario is a long-term non-use scenario, determining that the foam mode is the first foam mode;
  if the current usage scenario is a first frequent usage scenario, determining that the foam mode is the second foam mode; and
  if the current usage scenario is a second frequent usage scenario, determining that the foam mode is the third foam mode.

In another embodiment, determining the current usage scenario of the toilet specifically comprises:
  acquiring a current time and historical usage data of the toilet in response to a human-unseated event;
  determining a usage probability of the toilet in a first time period elapsed since the current time as a first probability according to the historical usage data of the toilet, and determining that the current usage scenario is a long-term non-use scenario when the first probability is less than or equal to a first probability threshold;
  otherwise, determining a usage probability of the toilet in a second time period elapsed since the current time as a second probability according to the historical usage data of the toilet, and determining that the current usage scenario is a first frequent usage scenario if the second probability is less than or equal to a second probability threshold; otherwise, determining that the current usage scenario is a second frequent usage scenario, wherein the second time period is less than or equal to the first time period.

In another embodiment, determining the foam mode associated with the current usage scenario according to the current usage scenario of the toilet specifically comprises:

determining the foam mode as the second foam mode or the third foam mode if the current usage scenario is a pre-use scenario of the toilet.

In another embodiment, determining the current usage scenario of the toilet specifically comprises:

determining that the current usage scenario is a pre-use scenario of toilet scenario when a seat ring flipped-up event or a human-seated event is detected.

In another embodiment, the executing the current foam mode specifically comprises:

determining whether foams still exist at a current time; and executing the third foam mode when determining that the foams still exist; otherwise, executing the second foam mode.

In another embodiment, determining that the foams still exist at the current time comprises:

taking a last execution time of the first foam mode as a first execution time, and taking a last execution time of the second foam mode as a second execution time;

when the seat ring flipped-up event is detected:

if the first execution time is within a first execution time threshold before the current time and no flushing is carried out in the first execution time threshold before the current time, or if the second execution time is within a second execution time threshold before the current time and no flushing is carried out in the second execution time threshold before the current time, determining that the foams still exist at a current time; otherwise, determining that no foams exist at the current time.

Determining that the foams still exist at the current time further comprises when the human-seated event is detected:

if the first execution time is within a third execution time threshold before the current time and no flushing is carried out in the third execution time threshold before the current time, or if the second execution time is within a fourth execution time threshold before the current time and no flushing is carried out in the fourth execution time threshold before the current time, determining that the foams still exist at a current time; otherwise, determining that no foams exist at the current time.

In another embodiment, determining the foam mode associated with the current usage scenario according to the current usage scenario of the toilet comprises: determining that the foam mode is the first foam mode if the current usage scenario is a customer-controlled foaming scenario or timing scenario.

The present disclosure provides an electronic device, comprising: at least one processor and a memory communicated with the at least one processor.

The memory stores instructions that can be executed by the at least one processor, and the instructions are executed by the at least one processor, so that the at least one processor can execute the control method for spraying foam by the toilet as described above.

The present disclosure provides a storage medium configured to store computer instructions. The computer instructions, when executed by a computer, are used to execute all steps of the control method for spraying foam by the toilet as described above.

The present disclosure executes different foam modes according to different usage scenarios of the toilet. Foaming methods are set reasonably to adapt to different application scenarios. Without affecting the use function, large foams are partially used instead of small foams, and thus the foaming liquid may be saved and the maintenance frequency may be reduced.

It is also necessary to provide a toilet foam generating mechanism with adjustable foam range and a toilet solving the technical problem that the foams sprayed by the foaming device in the toilet cannot fully cover the ceramic surface of the toilet.

The present disclosure provides a toilet foam generating mechanism with adjustable foam range. The toilet foam generating mechanism with adjustable foam range comprises: a foaming liquid adding passage, a water adding passage, an air inlet channel, a foam generating cavity, a foam spray nozzle, and a controller. The foaming liquid adding passage, the water adding passage, and the air inlet channel are communicated with the foam generating cavity. The foam spray nozzle is communicated with a foam outlet of the foam generating cavity. The air inlet channel comprises an air input device communicated with the foam generating cavity and a switching power supply electrically connected with a power supply end of the air input device. The switching power supply is communicated with the controller.

In another embodiment, the switching power supply is a pulse width modulation power supply.

In another embodiment, the air input device is an air pump.

In another embodiment, the foaming liquid adding passage comprises: a foaming liquid box and a liquid suction device. One end of the liquid suction device is communicated with the foaming liquid box, and the other end is communicated with the foam generating cavity.

In another embodiment, the liquid suction device is a liquid pump.

In another embodiment, the water adding passage comprises: a water tank and a water adding device. One end of the water adding device is communicated with the water tank, and the other end is communicated with the foam generating cavity.

In another embodiment, the water adding device is a water pump.

In another embodiment, a foam refining device is further comprised. The foam spray nozzle is communicated with the foam outlet through the foam refining device.

The present disclosure provides a toilet, comprising a toilet body and the toilet foam generating mechanism with adjustable foam range as described above. The toilet foam generating mechanism with adjustable foam range is fixed in the toilet body and the foam spray nozzle faces a toilet surface.

According to the present disclosure, the switching power supply is controlled through the controller. By changing the supplied power of the air input device, an air output of the air input device may be changed, and then a foam range sprayed may be changed, so that the foam range is adjustable. Thus, overall coverage of the toilet surface by the foams is realized. Meanwhile, the range is adjusted by adjusting the air output, rather than using water to adjust the range, which will not cause water waste.

Figure 1:
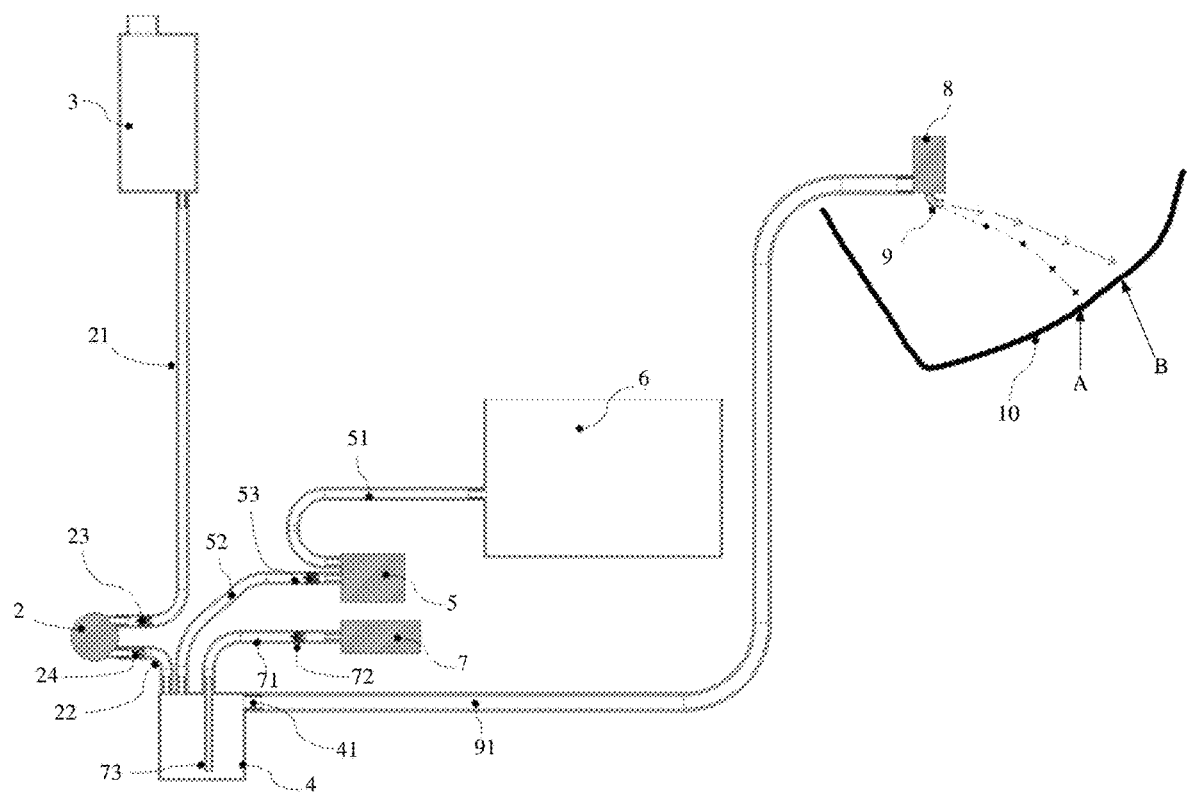
FIG. 1 is a schematic structural diagram of a toilet foam generating mechanism according to the present disclosure.

DESCRIPTIONS OF REFERENCE NUMERALS 1 refers to controller; 100 refers to switching power supply; 1001 refers to first switching power supply; 1002 refers to second switching power supply; 1003 refers to third switching power supply; 2 refers to liquid suction device; 21 refers to first liquid suction pipeline; 22 refers to second liquid suction pipeline; 23 refers to first spring-type one-way valve or first valve; 24 refers to second spring-type one-way valve or second valve; 3 refers to foaming liquid box (e.g., a foaming liquid chamber); 4 refers to foam generating cavity; 41 refers to foam outlet; 5 refers to water adding device; 51 refers to first water adding pipeline; 52 refers to second water adding pipeline; 53 refers to third spring-type one-way valve or third valve; 6 refers to water tank; 7 refers to air input device; 71 refers to air inlet pipeline; 72 refers to fourth spring-type one-way valve; 73 refers to air inlet or fourth valve; 8 refers to foam refining device; 9 refers to foam spray nozzle; 91 refers to foam spray pipeline; and 10 refers to toilet surface.

DETAILED DESCRIPTION

The present disclosure may be further described in detail hereinafter with reference to the accompanying drawings and the specific embodiments.

First Embodiment: A Toilet Foam Generating Mechanism

As a schematic structural diagram of a toilet foam generating mechanism of the present disclosure shown in FIG. 1, the toilet foam generating mechanism comprises a foaming liquid adding passage, a water adding passage, an air inlet channel, a foam generating cavity 4, and a foam spray nozzle 9. The foaming liquid adding passage, the water adding passage and the air inlet channel are communicated with the foam generating cavity 4, and the foam spray nozzle 9 is communicated with a foam outlet 41 of the foam generating cavity 4. The foaming liquid adding passage comprises a foaming liquid box (e.g., a foaming liquid chamber) 3 and a liquid suction device 2. The foaming liquid box 3 is communicated with the liquid suction device 2 through a first liquid suction pipeline 21, the liquid suction device 2 is communicated with the foam generating cavity 4 through a second liquid suction pipeline 22, the first liquid suction pipeline 21 is provided with a first valve 23 (e.g., a first spring-type one-way valve), and the second liquid suction pipeline 22 is provided with a second valve 24 (e.g., a second spring-type one-way valve).

Figure 2:
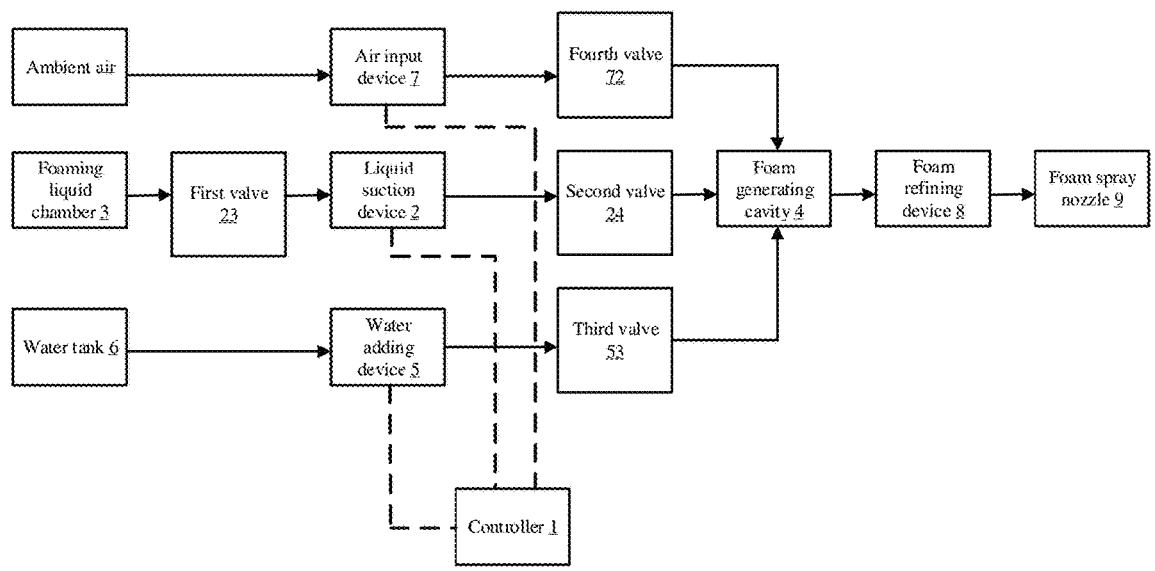
FIG. 2 is a system connection diagram of a toilet foam generating mechanism according to an embodiment of the present disclosure.

Specifically, as shown in FIG. 1 and FIG. 2, the foaming liquid adding passage supplies a foaming liquid to the foam generating cavity 4, the water adding passage supplies water to the foam generating cavity 4, and the air inlet channel supplies air to the foam generating cavity 4, so that foams are generated in the foam generating cavity 4. The foams are squeezed out of the foam generating cavity 4, flow through a foam spray pipeline 91 from the foam outlet 41 to the foam spray nozzle 9, are sprayed from the foam spray nozzle 9, and then enter a toilet surface 10.

The foaming liquid adding passage comprises the foaming liquid box 3 and the liquid suction device 2, and the foaming liquid box 3 is located above the liquid suction device 2. The foaming liquid box 3 is communicated with the liquid suction device 2 through the first liquid suction pipeline 21, the liquid suction device 2 is communicated with the foam generating cavity 4 through the second liquid suction pipeline 22, the first liquid suction pipeline 21 is provided with the first valve 23, and the second liquid suction pipeline 22 is provided with the second valve 24. The foaming liquid box 3 is isolated from the liquid suction device 2 when the first valve 23 is closed, and the foaming liquid box 3 is communicated with the liquid suction device 2 when the first valve 23 is opened. The liquid suction device 2 is isolated from the foam generating cavity 4 when the second valve 24 is closed, and the liquid suction device 2 is communicated with the foam generating cavity 4 when the second valve is opened. Therefore, when the first valve 23 and the second valve 24 are closed, the liquid suction device 2 may be completely sealed, so that a fluid in the liquid suction device 2 is completely isolated from the outside when not in use, and thus drying up may be avoided.

As shown in FIG. 2, the liquid suction device 2 may be controlled to be switched on or off by a controller 1, and the liquid suction device 2 may be in communication connection with the controller 1 in a wired or wireless manner. The controller 1 may be a micro control unit (MCU).

In one embodiment, the first valve 23 is a pressure valve, and the second valve 24 is a pressure valve.

When the fluid in the liquid suction device 2 is not in use, internal and external pressures of the liquid suction device 2 are the same, so that the pressure valves are closed, and the liquid suction device 2 is completely isolated from the outside, and thus drying up is avoided. When the liquid suction device 2 starts to operate, a pressure difference caused by the liquid suction device 2 pushes the pressure valves to open, and the fluid in the liquid suction device 2 is communicated with the outside to deliver the foaming liquid.

In an embodiment, the first valve 23 is a spring-type one-way valve, and the second valve 24 is a spring-type one-way valve. A flow direction of the first valve 23 is from the foaming liquid box 3 to the liquid suction device 2, and a flow direction of the second valve 24 is from the liquid suction device 2 to the foam generating cavity 4.

In another embodiment, the first valve 23 is an electromagnetic valve and the second valve 24 is an electromagnetic valve.

The controller synchronously controls the electromagnetic valves to open or close while controlling the liquid suction device 2 to open or close. When the liquid suction device 2 does not operate, the electromagnetic valves are controlled to be closed, so that the liquid suction device 2 is completely isolated from the outside, and thus drying up is avoided. When the liquid suction device 2 starts to operate, the electromagnetic valves are controlled to be opened, and the fluid in the liquid suction device 2 is communicated with the outside to deliver the foaming liquid.

According to the present disclosure, the valves are arranged on the first liquid suction pipeline and the second liquid suction pipeline, and the liquid suction device communicated with the first liquid suction pipeline and the second liquid suction pipeline is sealed through the valves, so that the fluid in the liquid suction device is completely isolated from the outside when not in use, and thus drying up is avoided.

Second Embodiment: A System Comprising the Toilet Foam Generating Mechanism of the First Embodiment As shown in FIG. 1 and FIG. 2, a toilet foam generating mechanism in an embodiment of the present disclosure comprises a foaming liquid adding passage, a water adding passage, an air inlet channel, a foam generating cavity 4, a foam spray nozzle 9, and a foaming refining device 8. The foaming liquid adding passage, the water adding passage and the air inlet channel are communicated with the foam generating cavity 4, and the foam spray nozzle 9 is communicated with a foam outlet 41 of the foam generating cavity 4. The foaming liquid adding passage comprises a foaming liquid box 3 and a liquid suction device 2. The foaming liquid box 3 is communicated with the liquid suction device 2 through a first liquid suction pipeline 21, the liquid suction device 2 is communicated with the foam generating cavity 4 through a second liquid suction pipeline 22, the first liquid suction pipeline 21 is provided with a first valve 23, and the second liquid suction pipeline 22 is provided with a second valve 24. The first valve 23 is a pressure valve, the second valve 24 is a pressure valve, and the liquid suction device 2 is a liquid pump.

The water adding passage comprises a water tank 6, a water adding device 5, a first water adding pipeline 51, and a second water adding pipeline 52. The water tank 6 is communicated with the foam generating cavity 4 through the first water adding pipeline 51, the water adding device 5 and the second water adding pipeline 52 in sequence. The second water adding pipeline 52 is provided with a third valve 53 (e.g., a third spring-type one-way valve), and the water adding device 5 is a water pump.

The foam spray nozzle 9 is communicated with the foam outlet 41 through the foam refining device 8, and the foam refining device 8 is a dispensing motor.

The air inlet channel comprises an air input device 7 communicated with the foam generating cavity 4 through an air inlet pipeline 71, and the air inlet pipeline 71 is provided with a fourth valve 72 (e.g., a fourth spring-type one-way valve).

Specifically, as shown in FIG. 1 and FIG. 2, the liquid suction device 2 sucks a foaming liquid from the foaming liquid box 3 and supplies the foaming liquid to the foam generating cavity 4, the water adding device 5 sucks water from the water tank 6 and supplies the water to the foam generating cavity 4, and the air input device 7 sucks ambient air and supplies the air to the foam generating cavity 4, so that foams are generated in the foam generating cavity 4. The foams are squeezed out of the foam generating cavity 4, flow through a foam spray pipeline 91 from the foam outlet 41 to the foam refining device 8, are refined by the foam refining device 8, sprayed from the foam spray nozzle 9, and then enter a toilet surface 10. There are different foam falling points under different working conditions, wherein A is a foam falling point under a first working condition, and B is a foam falling point under a second working condition.

In an embodiment, as shown in FIG. 2, the liquid suction device 2, the water adding device 5, and the air input device 7 are in communication connection with the controller 1 and are controlled to be switched on or off by the controller 1. Dotted lines in FIG. 2 refer to communication connection lines.

The foaming liquid box 3 is located above the liquid suction device 2. The foaming liquid box 3 is communicated with the liquid suction device 2 through the first liquid suction pipeline 21, the liquid suction device 2 is communicated with the foam generating cavity 4 through the second liquid suction pipeline 22, the first valve 23 is fixedly arranged in the first liquid suction pipeline 21, and the second valve 24 is fixedly arranged in the second liquid suction pipeline 22. The foaming liquid box 3 is isolated from the liquid suction device 2 when the first valve 23 is closed, and the foaming liquid box 3 is communicated with the liquid suction device 2 when the first valve 23 is opened. The liquid suction device 2 is isolated from the foam generating cavity 4 when the second valve 24 is closed, and the liquid suction device 2 is communicated with the foam generating cavity 4 when the second valve is opened. Therefore, when the first valve 23 and the second valve 24 are closed, the liquid suction device 2 may be completely sealed, so that the fluid in the liquid suction device 2 is completely isolated from the outside when not in use, and thus drying up is avoided. The first valve 23 and the second valve 24 are the pressure valves and may be spring-type one-way valves. A flow direction of the first valve 23 is from the foaming liquid box 3 to the liquid suction device 2, and a flow direction of the second valve 24 is from the liquid suction device 2 to the foam generating cavity 4. The liquid suction device 2 may be a liquid pump. When the fluid in the liquid pump is not in use, internal and external pressures of the liquid pump are the same, so that the pressure valve is closed, and the liquid pump is completely isolated from the outside, and thus drying up is avoided. When the liquid pump starts to operate, a pressure difference caused by the liquid pump pushes the pressure valve to open, and the fluid in the liquid pump is communicated with the outside to deliver the foaming liquid.

The water adding device 5 may be a water pump. The water adding device 5 sucks water from the water tank 6 through the first water adding pipeline 51 and supplies the water to the foam generating cavity 4 through the second water adding pipeline 52. A third valve 53 is fixedly arranged in the second water adding pipeline 52. The third valve 53 is a pressure valve and may be a spring-type one-way valve. A flow direction of the third valve 53 is from the water adding device 5 to the foam generating cavity 4. The water adding device 5 is isolated from the foam generating cavity 4 when the third valve 53 is closed, and the water adding device 5 is communicated with the foam generating cavity 4 when the third valve 53 is opened. Therefore, when the water pump does not operate, the third valve 53 stably blocks the water adding passage under the action of the spring of the one-way valve, thus avoiding the liquid from flowing into other passages.

The air input device 7 may be an air pump. The air input device 7 sucks the ambient air and outputs the air through the air inlet pipeline 71 from an air inlet 73, thus supplying the air to the foam generating cavity 4. A fourth valve 72 is fixedly arranged in the air inlet pipeline 71. The fourth valve 72 is a pressure valve and may be a spring-type one-way valve. A flow direction of the fourth valve 72 is from the air input device 7 to the foam generating cavity 4. The air input device 7 is isolated from the foam generating cavity 4 when the fourth valve 72 is closed, and the air input device 7 is communicated with the foam generating cavity 4 when the fourth valve 72 is opened. Therefore, when the air pump does not operate, the fourth valve 72 stably blocks the air inlet channel under the action of the spring of the one-way valve, thus avoiding the liquid from flowing into other passages.

According to the present disclosure, the valves are arranged on the first liquid suction pipeline and the second liquid suction pipeline, and the liquid suction device communicated with the first liquid suction pipeline and the second liquid suction pipeline is sealed through the valves, so that the fluid in the liquid suction device is completely isolated from the outside when not in use, and thus drying up is avoided. Meanwhile, the valves are additionally arranged in various fluid passages, and the passages are stably blocked under actions of the valves during non-operating. Thus, a possibility of "drooling" may be avoided. Meanwhile, the spring-type one-way valves are additionally provided, which reasonably control flowing of the liquid, and thus the fluid flowing from one passage into other passages is avoided.

Third Embodiment: A Toilet Comprising the Toilet Foam Generating Mechanism of the First Embodiment As shown in FIG. 1, a toilet of the present disclosure comprises a toilet body and the toilet foam generating mechanism as mentioned above. The toilet foam generating mechanism is fixed in the toilet body, and the foam spray nozzle 9 faces the toilet surface 10.

According to the present disclosure, the valves are arranged on the first liquid suction pipeline and the second liquid suction pipeline, and the liquid suction device communicated with the first liquid suction pipeline and the second liquid suction pipeline is sealed through the valves, so that the fluid in the liquid suction device is completely isolated from the outside when not in use, and thus drying up is avoided.

The above embodiments merely express several embodiments of the present disclosure, and the descriptions thereof are more specific and detailed, but these embodiments cannot be understood as a limitation to the patent scope of the present disclosure. It should be noted that those of ordinary skills in the art may make a plurality of variations and improvements without departing from the conception of the present disclosure, and these variations and improvements shall all fall within the protection scope of the present disclosure. Therefore, the protection scope of the patent according to the present disclosure shall be subjected to the claims appended.

The present disclosure will be further described in detail hereinafter with reference to the accompanying drawings and the specific embodiments.

Fourth Embodiment: A Toilet Foam Generating Mechanism with Adjustable Foam Size

Figure 10:
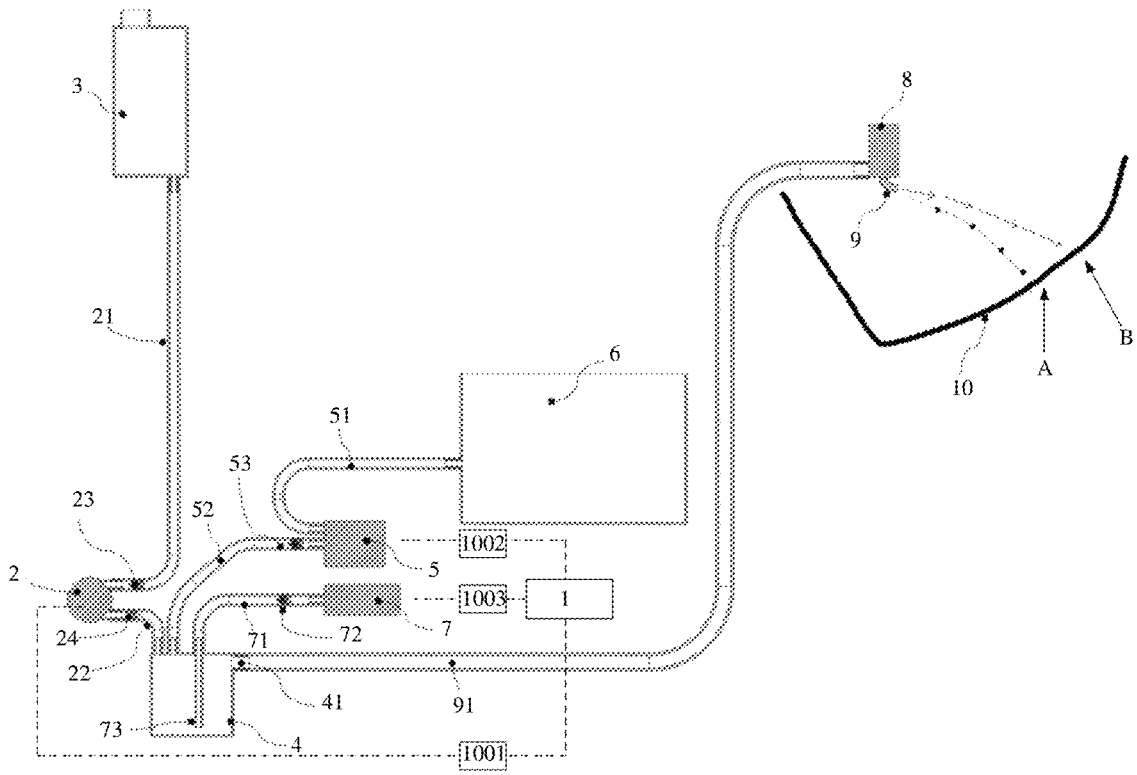
FIG. 10 is a schematic structural diagram of a toilet foam generating mechanism with adjustable foam size according to an embodiment of the present disclosure.

FIG. 10 shows a toilet foam generating mechanism with adjustable foam size according to the present disclosure, comprising: a foaming liquid adding passage, a water adding passage, an air inlet channel, a foam generating cavity 4, a foam spray nozzle 9, and a controller 1. The foaming liquid adding passage, the water adding passage and the air inlet channel are communicated with the foam generating cavity 4, the foam spray nozzle 9 is communicated with a foam outlet 41 of the foam generating cavity 4, and the foaming liquid adding passage comprises a foaming liquid box (e.g., a foaming liquid chamber) 3 and a liquid suction device 2; one end of the liquid suction device 2 is communicated with the foaming liquid box 3 and the other end is communicated with the foam generating cavity 4; a power supply end of the liquid suction device 2 is electrically connected with a first switching power supply 1001, and the controller 1 is communicated with the first switching power supply 1001.

Figure 11:
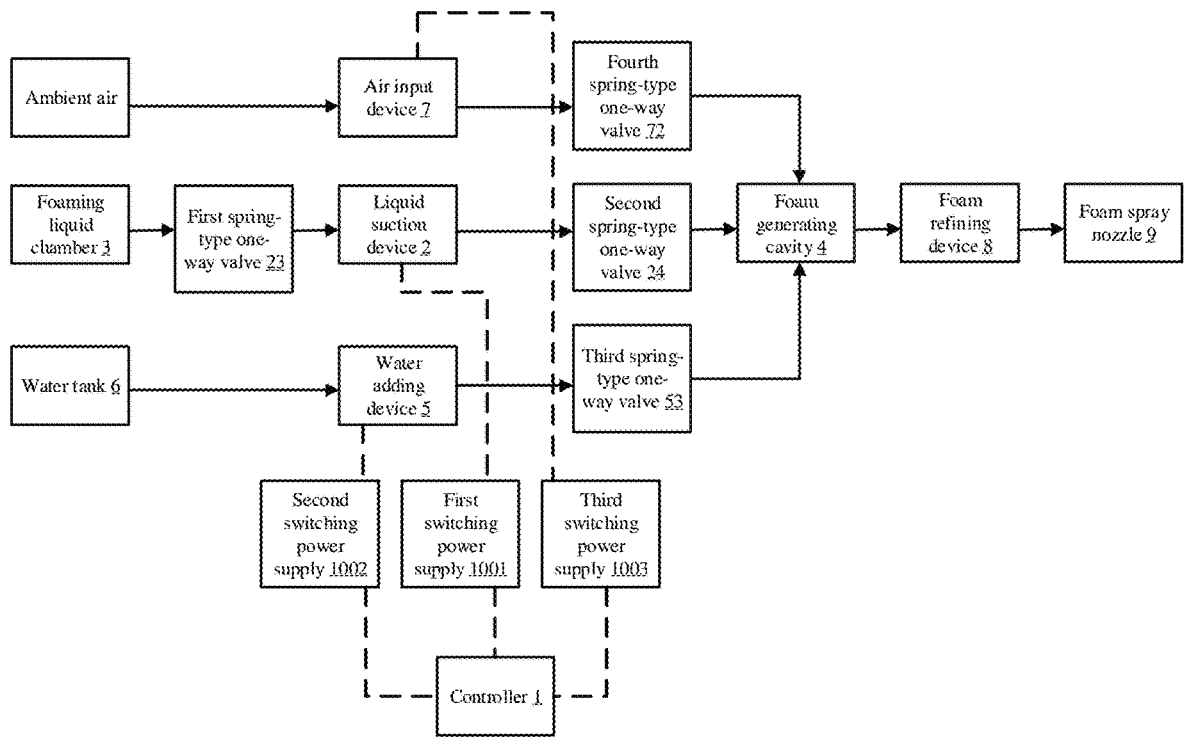
FIG. 11 is a system connection diagram of a toilet foam generating mechanism with adjustable foam size according to an embodiment of the present disclosure.

Specifically, as shown in FIG. 10 and FIG. 11, the foaming liquid adding passage supplies a foaming liquid to the foam generating cavity 4, the water adding passage supplies water to the foam generating cavity 4, and the air inlet channel supplies air to the foam generating cavity 4, so that foams are generated in the foam generating cavity 4. The foams are squeezed out of the foam generating cavity 4, flow through a foam spray pipeline 91 from the foam outlet 41 to the foam spray nozzle 9, are sprayed from the foam spray nozzle 9, and then enter a toilet surface 10. Foam falling points vary in different working conditions. A is a foam falling point under a first working condition, and B is a foam falling point under a second working condition.

The foaming liquid adding passage comprises the foaming liquid box 3 and the liquid suction device 2; one end of the liquid suction device 2 is communicated with the foaming liquid box 3 and the other end is communicated with the foam generating cavity 4; the power supply end of the liquid suction device 2 is electrically connected with the first switching power supply 1001, the controller 1 is communicated with the first switching power supply 1001, and the controller 1 controls a duty ratio of the power supply output by the first switching power supply 1001 to the liquid suction device 2, thus adjusting a volume of a foaming liquid pumped into the foam generating cavity 4 by the liquid suction device 2. When the volume of the foaming liquid pumped into the foam generating cavity changes, the size structure of the generated foam may be changed, so that the foam size is adjustable.

The first switching power supply 1001 is communicated with the controller 1 through wired or wireless means. The controller may be a Micro Control Unit (MCU).

According to the present disclosure, the first switching power supply is controlled through the controller, thereby changing the supplied power of the liquid suction device to change the volume of the foaming liquid pumped into the foam generating cavity by the liquid suction device, and then changing the size of the generated foam. Therefore, foam structures with various sizes can be produced, and without affecting the use function, large foams are partially used instead of small foam. Thus, the foaming liquid may be saved and the maintenance frequency may be reduced.

Fifth Embodiment: A System Comprising the Toilet Foam Generating Mechanism with Adjustable Foam Size of the Fourth Embodiment As shown in FIG. 10 and FIG. 11, a toilet foam generating mechanism with adjustable foam size in an embodiment of the present disclosure comprises: a foaming liquid adding passage, a water adding passage, an air inlet channel, a foam generating cavity 4, a foam spray nozzle 9, a controller 1, and a first switching power supply 1001. The foaming liquid adding passage, the water adding passage, and the air inlet channel are communicated with the foam generating cavity 4. The foam spray nozzle 9 is communicated with a foam outlet 41 of the foam generating cavity 4. The foaming liquid adding passage comprises a foaming liquid box 3 and a liquid suction device 2. One end of the liquid suction device 2 is communicated with the foaming liquid box 3 and the other end is communicated with the foam generating cavity 4. The liquid suction device 2 is a liquid pump, a power supply end of the liquid suction device 2 is electrically connected with the first switching power supply 1001, and the controller 1 is communicated with the first switching power supply 1001. In an embodiment, the first switching power supply 1001 is a pulse width modulation power supply.

The water adding passage comprises a water tank 6 and a water adding device 5, one end of the water adding device 5 is communicated with the water tank 6, and the other end is communicated with the foam generating cavity 4. The water adding device 5 is a water pump.

The air inlet channel comprises an air input device 7 communicated with the foam generating cavity 4, and the air input device 7 is an air pump.

Specifically, as shown in FIG. 10 and FIG. 11, the liquid suction device 2 sucks a foaming liquid from the foaming liquid box 3 and supplies the foaming liquid to the foam generating cavity 4, the water adding device 5 sucks water from the water tank 6, and supplies the water to the foam generating cavity 4, and the air input device 7 sucks ambient air and supplies the air to the foam generating cavity 4, so that foams are generated in the foam generating cavity 4. The foams are squeezed out of the foam generating cavity 4, sprayed from the foam spray nozzle 9 through the foam outlet 41, and then enter a toilet surface 10. In an embodiment, the foam spray nozzle 9 is communicated with the foam outlet 41 of the foam generating cavity 4 through the foam refining device 8. The foams flow through a foam spray pipeline 91 from the foam outlet 41 to the foam refining device 8, are thinned by the foam refining device 8, and then sprayed from the foam spray nozzle 9. The foam refining device 8 is a dispensing motor.

The water adding device 5 and the air input device 7 are communicated with the controller 1 by wired or wireless means and are controlled to be opened or closed by the controller 1. The dotted lines in FIG. 10 and FIG. 11 are communication lines or electrical connection lines.

Meanwhile, the controller 1 is communicated with the first switching power supply 1001 by wired or wireless means, and the first switching power supply 1001 is electrically connected with the power supply end of the liquid suction device 2. The controller 1 controls the first switching power supply 1001 to turn on or off and controls the first switching power supply 1001 to output power supply with different duty ratios through different signals output to the first switching power supply 1001. The first switching power supply 1001 may be a Pulse Width Modulation (PWM) power supply. The first switching power supply 1001 changes the duty ratio of the output power supply according to different level signals input by the controller 1. The duty ratio is a ratio of a period time occupied by a high level to a whole period time, so the duration of the high level varies with the duty ratio. The larger the duty ratio, the longer the duration of the high level per unit time, and the longer the opening time of the liquid suction device 2, so that the volume of the foaming liquid pumped into the foam generating cavity 4 will increase. The smaller the duty ratio, the shorter the duration of the high level per unit time, and the shorter the opening time of the liquid suction device 2, so that the volume of the foaming liquid pumped into the foam generating cavity 4 will be smaller. When the volume of the foaming liquid pumped into the foam generating cavity 4 by the liquid suction device 2 changes, the size structure of the foam will change.

The foaming liquid box 3 is located above the liquid suction device 2. The foaming liquid box 3 is communicated with the liquid suction device 2 through a first liquid suction pipeline 21, the liquid suction device 2 is communicated with the foam generating cavity 4 through a second liquid suction pipeline 22, a first spring-type one-way valve 23 is fixedly arranged in the first liquid suction pipeline 21, and a second spring-type one-way valve 24 is fixedly arranged in the second liquid suction pipeline 22. A flow direction of the first spring-type one-way valve 23 is from the foaming liquid box 3 to the liquid suction device 2, and a flow direction of the second spring-type one-way valve 24 is from the liquid suction device 2 to the foam generating cavity 4. The foaming liquid box 3 is isolated from the liquid suction device 2 when the first spring-type one-way valve 23 is closed, and the foaming liquid box 3 is communicated with the liquid suction device 2 when the first spring-type one-way valve 23 is opened. The liquid suction device 2 is isolated from the foam generating cavity 4 when the second spring-type one-way valve 24 is closed, and the liquid suction device 2 is communicated with the foam generating cavity 4 when the second spring-type one-way valve is opened. Therefore, when the first spring-type one-way valve 23 and the second spring-type one-way valve 24 are closed, the liquid suction device 2 may be completely closed, so that a fluid in the liquid suction device 2 may be completely isolated from the outside when not in use, and thus drying up may be avoided. The liquid suction device 2 may be a liquid pump. When the fluid in the liquid pump is not in use, internal and external pressures of the liquid pump are the same, so that the pressure valve is closed, and the liquid pump is completely isolated from the outside, and thus drying up is avoided. When the liquid pump starts to operate, a pressure difference caused by the liquid pump pushes the pressure valve to open, and the fluid in the liquid pump is communicated with the outside to deliver the foaming liquid.

The water adding device 5 may be a water pump. The water tank 6 is communicated with the foam generating cavity 4 through a first water adding pipeline 51, the water adding device 5 and a second water adding pipeline 52 in turn. The water adding device 5 sucks water from the water tank 6 through the first water adding pipeline 51 and supplies water to the foam generating cavity 4 through the second water adding pipeline 52. A third spring-type one-way valve 53 is fixedly arranged in the second water adding pipeline 52. A flow direction of the third spring-type one-way valve 53 is from the water adding device 5 to the foam generating cavity 4. The water adding device 5 is isolated from the foam generating cavity 4 when the third spring-type one-way valve 53 is closed, and the water adding device 5 is communicated with the foam generating cavity 4 when the third spring-type one-way valve 53 is opened. Therefore, when the water pump does not operate, the third spring-type one-way valve 53 stably blocks the water adding passage under the action of the spring of the one-way valve, thus avoiding the liquid from flowing into other passages.

The air input device 7 may be an air pump. The air input device 7 sucks the ambient air and outputs the air through an air inlet pipeline 71 from an air inlet 73, and thus supplies the air to the foam generating cavity 4. A fourth spring-type one-way valve 72 is fixedly arranged in the air inlet pipeline 71. A flow direction of the fourth spring-type one-way valve 72 is from the air input device 7 to the foam generating cavity 4. The air input device 7 is isolated from the foam generating cavity 4 when the fourth spring-type one-way valve 72 is closed, and the air input device 7 is communicated with the foam generating cavity 4 when the fourth spring-type one-way valve 72 is opened. Therefore, when the water pump does not operate, the fourth spring-type one-way valve 72 stably blocks the air inlet channel under the action of the spring of the one-way valve, thus avoiding the liquids from flowing into other passages.

Specifically, in order to reduce the consumption of the foaming liquid, the toilet is provided with two or more foam sizes:
1. When "predicting that the toilet will not be used for a long time", smaller foams are sprayed to maintain a longer life of the foam.
2. Larger foams are sprayed "before the toilet is used or during frequent use", which only prevents splashing water.
3. When the toilet is used very frequently, the toilet should be mainly cleaned by flushing, without spraying foams automatically.

Through the above mode and the structure capable of generating two or more sizes of foams, and without affecting the use function, large foams are partially used instead of small foams. Thus, the foaming liquid may be saved and the maintenance frequency may be reduced.

For example, two foam sizes are sprayed. According to the foam sizes, the foams with large foam size are defined as large foams, and the foams with small foam size are defined as small foams. The controller 1 controls the volume of the foaming liquid of the liquid pump during one foam spraying process.

When spraying small foams, the controller 1 controls the liquid pump to pump out foaming liquid with a volume V1 in one foam spraying process.

When spraying large foams, the controller 1 controls the liquid pump to pump out foaming liquid with a volume V2 in one foam spraying process, wherein V2 is smaller than V1.

Meanwhile, the large and small foams are automatically selected according to the occasion of use. The occasion of use includes, but is not limited to:
scenario 1: when a seat ring is turned/flipped up (corresponding to men standing in front of a urination);
scenario 2: When a human body is seated (corresponding to sitting on toilet);
scenario 3: when the human body leaves the seat (corresponding to finishing flushing);
scenario 4: when a customer controls foaming—generating small foams; and
scenario 5: regular foaming—generating small foams.

According to the present disclosure, the first switching power supply is controlled through the controller, thereby changing the supplied power of the liquid suction device to change the volume of the foaming liquid pumped into the foam generating cavity by the liquid suction device, and then changing the size of the generated foam. By the structure generating two or more sizes of foams, and without affecting the use function, large foams are partially used instead of small foams, and different foaming methods are used to adapt to different application scenarios. The effect of reducing the maintenance frequency without affecting the use effect is achieved.

In one embodiment, a power supply end of the water adding device 5 is electrically connected with a second switching power supply 1002, and the controller 1 is communicated with the second switching power supply 1002; and/or
a power supply end of the air input device 7 is electrically connected with a third switching power supply 1003, and the controller 1 is communicated with the third switching power supply 1003.

The controller 1 is communicated with the second switching power supply 1002 or the third switching power supply 1003 by wired or wireless means, the second switching power supply 1002 is electrically connected with the power supply end of the water adding device 5, and the third switching power supply 1003 is electrically connected with the power supply end of the air intake device 7. The controller 1 controls the second switching power supply 1002 and/or the third switching power supply 1003 to turn on or off and controls the second switching power supply 1002 and/or the third switching power supply 1003 to output power supply with different duty ratios through different signals output to the second switching power supply 1002 and/or the third switching power supply 1003. The second switching power supply 1002 and the third switching power supply may be Pulse Width Modulation (PWM) power supplies.

The second switching power supply 1002 changes the duty ratio of the output power supply according to different level signals input by the controller 1. The larger the duty ratio, the longer the duration of the high level per unit time, and the longer the opening time of the water adding device 5, so that the volume of the water supplied to the foam generating cavity 4 will increase. The smaller the duty ratio, the shorter the duration of the high level per unit time, and the shorter the opening time of the water adding device 5, so that the volume of the water supplied to the foam generating cavity 4 will be smaller. The different volume of the water may change the size structure of the foam.

The third switching power supply 1003 changes the duty ratio of the output power supply according to different level signals input by the controller 1. The larger the duty ratio, the longer the duration of the high level per unit time, and the longer the opening time of the air input device 7, so that the air supplied to the foam generating cavity 4 will increase. The smaller the duty ratio, the shorter the duration of the high level per unit time, and the shorter the opening time of the air input device 7, so that the air supplied to the foam generating cavity 4 will be smaller. The different supply amount of the air may change the size structure of the foam.

According to the present disclosure, the second switching power supply or the third switching power supply is controlled through the controller, thereby changing the suppled power of the water adding device or the air input device to change the water or air amount pumped into the foam generating cavity by the water adding device or the air input device, and then changing the size of the generated foam.

Sixth Embodiment: A Toilet Comprising the Toilet Foam Generating Mechanism with Adjustable Foam Size of the Fourth Embodiment As shown in FIG. 10, the present disclosure provides a toilet, comprising a toilet body and the toilet foam generating mechanism with adjustable foam size as described above, wherein the toilet foam generating mechanism is fixed in the toilet body and the foam spray nozzle 9 faces a toilet surface 10.

According to the present disclosure, the first switching power supply is controlled through the controller, thereby changing the supplied power of the liquid suction device to change the volume of the foaming liquid pumped into the foam generating cavity by the liquid suction device, and then changing the size of the generated foam. Therefore, foam structures with various sizes can be produced, and without affecting the use function, large foams are partially used instead of small foams. Thus, the foaming liquid may be saved and the maintenance frequency may be reduced.

The above embodiments merely express several embodiments of the present disclosure, and the descriptions thereof are more specific and detailed, but these embodiments cannot be understood as a limitation to the patent scope of the present disclosure. It should be noted that those of ordinary skills in the art may make a plurality of variations and improvements without departing from the conception of the present disclosure, and these variations and improvements shall all fall within the protection scope of the present disclosure. Therefore, the protection scope of the patent according to the present disclosure shall be subjected to the claims appended.

The present disclosure will be further described in detail below with reference to the accompany drawings and specific embodiments.

Seventh Embodiment: A Control Method for Spraying Foam by a Toilet

Figure 3:
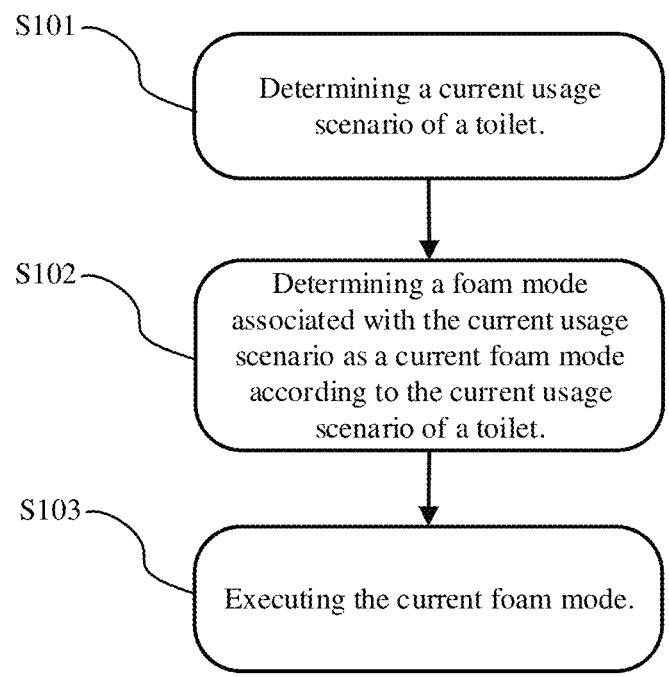
FIG. 3 is a workflow chart of a control method for spraying foam by a toilet according to the present disclosure.

FIG. 3 is a workflow chart of a control method for spraying foam by a toilet according to the present disclosure. The method comprises:
step S101: determining a current usage scenario of the toilet;
step S102: determining a foam mode associated with the current usage scenario as a current foam mode according to the current usage scenario of the toilet; and
step S103: executing the current foam mode.

Specifically, the present disclosure may be applied to a controller of an intelligent toilet. When step S101 is executed, the usage scenario of the toilet is determined based on information of various sensors. The sensors comprise, but are not limited to: infrared sensors, temperature sensors, pressure sensors, and the like. Then, the corresponding foam mode is determined according to the usage scenario in step S102, and the foam mode is executed in step S103. In different foam modes, the toilet may generate foams or may not spray foams. In different foam modes, mean diameters of the foam generated are different.

Specifically, the large and small foams are automatically selected according to the occasion of use.
scenario 1: when a seat ring is turned or flipped up (corresponding to men standing in front of a urination);
scenario 2: when a human body is seated (corresponding to sitting on toilet);
scenario 3: when the human body leaves the seat (corresponding to finishing flushing);
scenario 4: when a customer controls foaming—generating small foams; and
scenario 5: regular foaming—generating small foams.

The present disclosure executes different foam modes according to different usage scenarios of the toilet. Foaming methods are set reasonably to adapt to different application scenarios. Without affecting the use function, large foams are partially used instead of small foams, and thus the foaming liquid may be saved and the maintenance frequency may be reduced.

Eighth Embodiment: A Control Method for Spraying Foam by a Toilet

Figure 4:
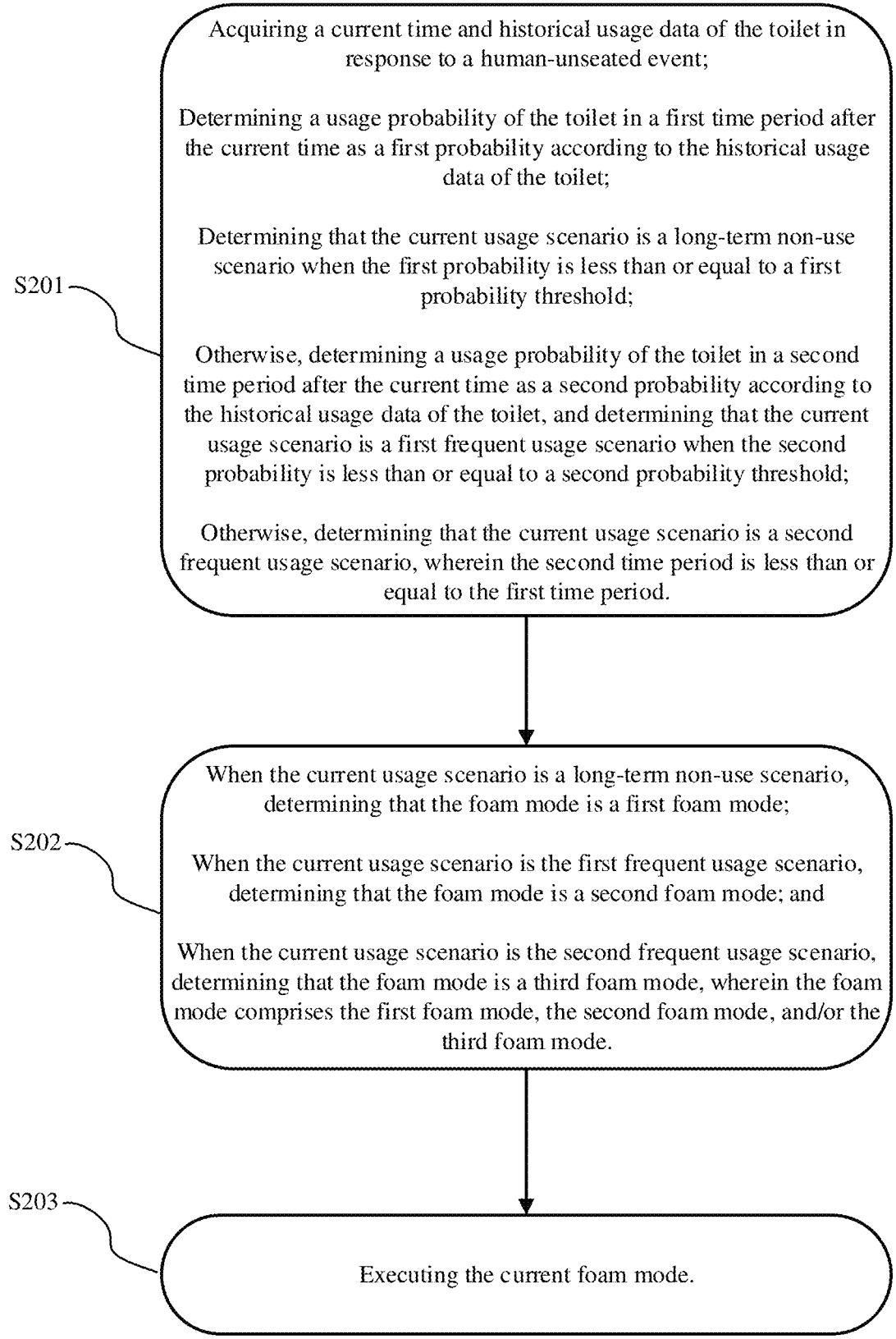
FIG. 4 is a workflow chart of a control method for spraying foam by a toilet according to an embodiment of the present disclosure.

FIG. 4 is a workflow chart of a control method for spraying foam by a toilet according to an embodiment of the present disclosure.

The method comprises step S201: acquiring a current time and historical usage data of the toilet in response to a human-unseated event;
determining a usage probability of the toilet in a first time period after the current time as a first probability according to the historical usage data of the toilet;
determining that the current usage scenario is a long-term non-use scenario when the first probability is less than or equal to a first probability threshold;
otherwise, determining a usage probability of the toilet in a second time period after the current time as a second probability according to the historical usage data of the toilet, and determining that the current usage scenario is a first frequent usage scenario when the second probability is less than or equal to a second probability threshold;
otherwise, determining that the current usage scenario is a second frequent usage scenario, wherein the second time period is less than or equal to the first time period.

The method further comprises step S202: when the current usage scenario is a long-term non-use scenario, determining that the foam mode is a first foam mode;
when the current usage scenario is the first frequent usage scenario, determining that the foam mode is a second foam mode; and
when the current usage scenario is the second frequent usage scenario, determining that the foam mode is a third foam mode,
wherein the foam mode comprises the first foam mode, the second foam mode, and/or the third foam mode,
wherein a mean diameter of foams generated when the first foam mode is executed being less than or equal to a mean diameter of foams generated when the second foam mode is executed, and
wherein no foams is sprayed when the third foam mode is executed.

The method further comprises step S203: executing the current foam mode.

Specifically, in order to reduce the consumption of the foaming liquid, the toilet is provided with two or more foam sizes:
1. When the toilet is unused for a long time, i.e., the current usage scenario is the long-term non-use scenario, the first foam mode is employed to spray smaller foams to maintain a longer life of the foam.
2. When the toilet is frequently used, i.e., the current usage scenario is the first frequent usage scenario, the second foam mode is employed to spray larger foams, which only prevents splashing water.
3. When the toilet is used very frequently, i.e., the current usage scenario is the second frequent usage scenario, the toilet is mainly cleaned by flushing, then the third foam mode is employed, without spraying foams automatically.

The first foam mode sprays smaller foams, the second foam mode sprays larger foams, and the third foam mode does not spray foams.

For determining the usage scenario of the toilet, the current time and the historical usage data of the toilet are acquired in response to the human-unseated event in step S201. The human-unseated event may be detected by various existing methods, such as infrared sensing or pressure sensor detection. Then, the usage probability of the toilet is determined according to the historical usage data of the toilet. The historical usage data of the toilet comprises a number of times the toilet has been used in different time periods. The historical data of the toilet are divided by different dimensions, for example, a number of times the toilet has been used from Monday to Sunday. Then, the selected historical data of the toilet is determined according to the current time. For example, the corresponding historical data of the toilet is selected according to a current day of a week. For example, the historical data of the toilet on Monday is selected when the current time is Monday.

The current time comprises week information and clock information, which comprises a day of the week and a time of the day. Therefore, the historical data of the toilet corresponding to the week information and the clock information are selected according to the week information and the clock information. Then, the historical data of the toilet in the first time period corresponding to the week information and the clock information are extracted, a number of times of the historical data of the toilet with usage records are counted, and a proportion of the number of times with the usage records is calculated as the first probability. The historical data of the toilet in the second time period corresponding to the week information and the clock information are extracted, a number of times of the historical data of the toilet with usage records are counted, and a proportion of the number of times with the usage records is calculated as the second probability.

For example, the current time is 4 pm on Monday and the first time period is 1 hour, the historical data of the toilet within 1 hour after 4 pm on Monday are extracted from the whole historical data. If there is at least one usage record in the historical data of the toilet within 1 hour after 4 pm on one of the Mondays, the historical data of the toilet within 1 hour after 4 pm on that Monday is taken as the data with a usage record. If there is no usage record in the historical data of the toilet within 1 hour after 4 pm on one of the Mondays, the historical data of the toilet within 1 hour after 4 pm on that Monday is taken as the historical data without a usage record. The first probability is a number of the historical data with usage records/(the number of the historical data with usage records+the number of the historical data without usage records). If there are multiple usage records in the historical data of the toilet within 1 hour after 4 pm on one of the Mondays, only one usage record is recorded.

For example, the current time is 4 pm on Monday and the second time period is 5 minutes, the historical data of the toilet within 5 minutes after 4 pm on Monday are extracted from the whole historical data of the toilet. If there is at least one usage record in the historical data of the toilet within 5 minutes after 4 pm on one of the Mondays, the historical data of the toilet within 5 minutes after 4 pm on that Monday is taken as the data with a usage record. If there is no usage record in the historical data of the toilet within 5 minutes after 4 pm on one of the Mondays, the historical data of the toilet within 5 minutes after 4 pm on that Monday is taken as the historical data without a usage record. The second probability is a number of the historical data with usage records/(the number of the historical data with usage records+the number of the historical data without usage records). If there are multiple usage records in the historical data of the toilet within 5 minutes after 4 pm on one of the Mondays, only one usage record is recorded.

By the above way, the usage probabilities in different time and different time dimensions are determined, so as to determine the current usage scenario. The second time period is less than or equal to the first time period. Therefore, if the first probability obtained according to the first time period is less than or equal to the first probability threshold, it means that it is predicted that no one will use the toilet for a long time, so the current usage scenario is the long-term non-use scenario, and the first foam mode is employed to maintain a long life of the foam by spraying small foams. If the first probability is greater than the first probability threshold, it means that someone is likely to use the toilet in the first time period, which belongs to the scenario that the toilet is frequently used. In this case, if the second probability is less than or equal to the second probability threshold, it indicates that no one may use the toilet in the second time period. Therefore, in this scenario, the toilet is not used very frequently, and the second foam mode is employed, which only prevents splashing water by spraying larger foams and saves the use of the foaming liquid. However, if the second probability is greater than the second probability threshold, it means that the toilet is used very frequently, so the third foam mode is employed and no foams are sprayed.

According to the historical usage data of the toilet, this embodiment accurately determines the usage scenario of the toilet, thereby employing an appropriate foam mode and reducing the consumption of the foaming liquid. The effect of reducing the maintenance frequency without affecting the use effect is achieved.

Figure 5:
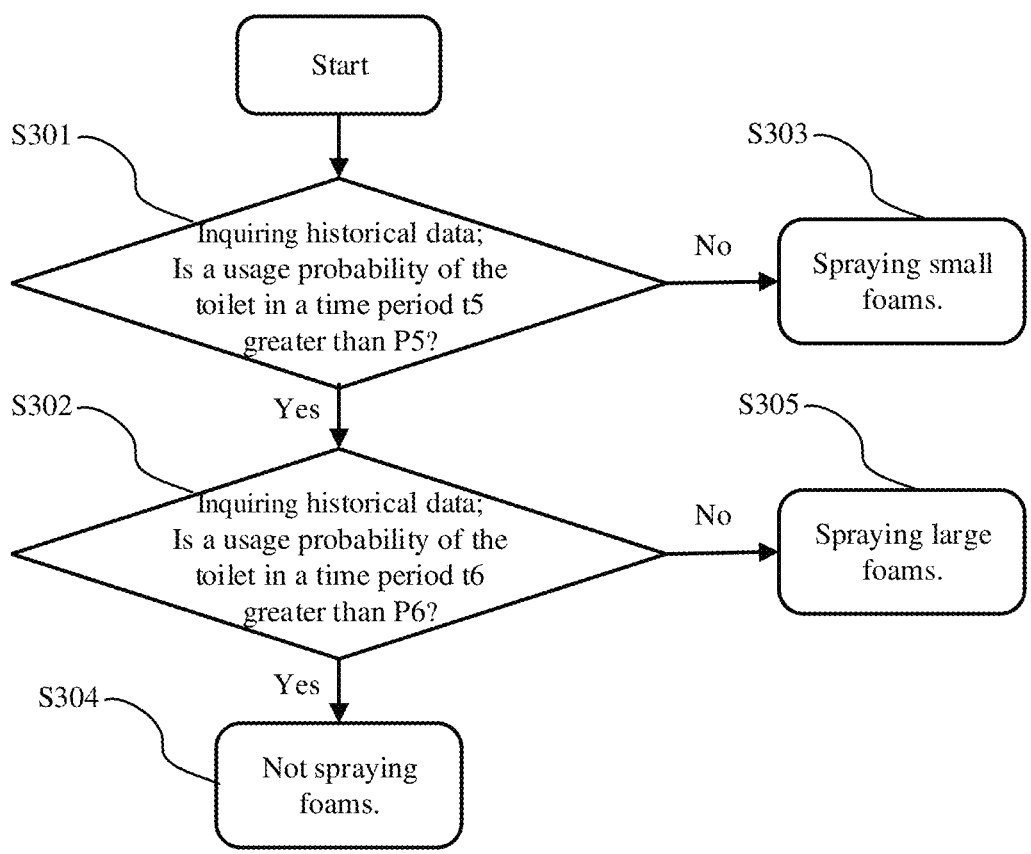
FIG. 5 is a workflow chart of a control method for spraying foam by a toilet according to an embodiment of the present disclosure when a human body leaves a seat.

As an example, FIG. 5 shows a workflow chart of a control method for spraying foam by a toilet according to an embodiment of the present disclosure when a human body is unseated, comprising:
step S301: inquiring historical data and determining whether a usage probability of the toilet in a time period t5 is greater than P5; if Yes in S301, executing step S302; if No in S301, spraying small foams at S303; and
step S302: inquiring historical data and determining whether a usage probability of the toilet in a time period t6 is greater than P6; if Yes in S302, not spraying foams at S304; if No in S302, spraying large foams at S305.

Specifically, t5 is a urine splash-proof retention time of large-foam, which may be 1 hour, and T6 may be 5 minutes. P5 and P6 may be 85%.

At step S301, it is determined that the usage probability of the toilet is low in the current time plus the time period t5, that is, it is predicted that the toilet is not used for a long time, and small foams are sprayed. At step S302, it is determined that the usage probability of the toilet is high in the current time plus the time period t6, that is, the toilet is used very frequently, and no foams are sprayed; otherwise, it is deemed that the toilet is used frequently, and large foams are sprayed.

The control method for spraying foam by the toilet according to the present disclosure may be applied to a toilet employing a toilet foam generating mechanism with adjustable foam size as shown in FIG. 10 and FIG. 11. The toilet foam generating mechanism with adjustable foam size in an embodiment of the present disclosure comprises: a foaming liquid adding passage, a water adding passage, an air inlet channel, a foam generating cavity 4, a foam spray nozzle 9, a controller 1, and a first switching power supply 1001. The foaming liquid adding passage, the water adding passage and the air inlet channel are communicated with the foam generating cavity 4, the foam spray nozzle 9 is communicated with a foam outlet 41 of the foam generating cavity 4, and the foaming liquid adding passage comprises a foaming liquid box (e.g., a foaming liquid chamber) 3 and a liquid suction device 2. One end of the liquid suction device 2 is communicated with the foaming liquid box 3 and the other end is communicated with the foam generating cavity 4. The liquid suction device 2 is a liquid pump, a power supply end of the liquid suction device 2 is electrically connected with the first switching power supply 1001, and the controller 1 is communicated with the first switching power supply 1001. In an embodiment, the first switching power supply 1001 is a pulse width modulation power supply.

The water adding passage comprises a water tank 6 and a water adding device 5, one end of the water adding device 5 is communicated with the water tank 6, and the other end is communicated with the foam generating cavity 4. The water adding device 5 is a water pump.

The air inlet channel comprises an air input device 7 communicated with the foam generating cavity 4, and the air input device 7 is an air pump.

Specifically, as shown in FIG. 10 and FIG. 11, the liquid suction device 2 sucks a foaming liquid from the foaming liquid box 3 and supplies the foaming liquid to the foam generating cavity 4. The water adding device 5 sucks water from the water tank 6 and supplies the water to the foam generating cavity 4. The air input device 7 sucks ambient air and supplies the air to the foam generating cavity 4. Thus, the foams are generated in the foam generating cavity 4. The foams are squeezed out of the foam generating cavity 4, sprayed from a foam spray nozzle 9 via the foam outlet 41, and then enter a toilet surface 10. In an embodiment, the foam spray nozzle 9 is communicated with the foam outlet 41 of the foam generating cavity 4 through the foam refining device 8. The foams flow through a foam spray pipeline 91 from the foam outlet 41 to the foam refining device 8, are refined by the foam refining device 8, and then sprayed from the foam spray nozzle 9. The foam refining device 8 may be a dispensing motor.

The water adding device 5 and the air input device 7 are communicated with the controller 1 by wired or wireless means and are controlled to be opened or closed by the controller 1. The dotted lines in FIG. 10 and FIG. 11 are communication lines or electrical connection lines.

Meanwhile, the controller 1 is communicated with the first switching power supply 1001 by wired or wireless means, and the first switching power supply 1001 is electrically connected with the power supply end of the liquid suction device 2. The controller 1 controls the first switching power supply 1001 to turn on or off and controls the first switching power supply 1001 to output power supply with different duty ratios through different signals output to the first switching power supply 1001. The first switching power supply 1001 may be a Pulse Width Modulation (PWM) power supply. The first switching power supply 1001 changes the duty ratio of the output power supply according to different level signals input by the controller 1. The duty ratio is a ratio of a period time occupied by a high level to a whole period time, so the duration of the high level varies with the duty ratio. The larger the duty ratio, the longer the duration of the high level per unit time, and the longer the opening time of the liquid suction device 2, so that the volume of the foaming liquid pumped to the foam generating cavity 4 may increase. The smaller the duty ratio, the shorter the duration of the high level per unit time, and the shorter the opening time of the liquid suction device 2, so that the volume of the foaming liquid pumped to the foam generating cavity 4 will be smaller. When the volume of the foaming liquid pumped to the foam generating cavity 4 by the liquid suction device 2 changes, the size structure of the foam will be changed.

The foaming liquid box 3 is located above the liquid suction device 2. The foaming liquid box 3 is communicated with the liquid suction device 2 through a first liquid suction pipeline 21. The liquid suction device 2 is communicated with the foam generating cavity 4 through a second liquid suction pipeline 22. A first spring-type one-way valve 23 is fixedly arranged in the first liquid suction pipeline 21. A second spring-type one-way valve 24 is fixedly arranged in the second liquid suction pipeline 22. A flow direction of the first spring-type one-way valve 23 is from the foaming liquid box 3 to the liquid suction device 2, and a flow direction of the second spring-type one-way valve 24 is from the liquid suction device 2 to the foam generating cavity 4. The foaming liquid box 3 is isolated from the liquid suction device 2 when the first spring-type one-way valve 23 is closed, and the foaming liquid box 3 is communicated with the liquid suction device 2 when the first spring-type one-way valve 23 is opened. The liquid suction device 2 is isolated from the foam generating cavity 4 when the second spring-type one-way valve 24 is closed, and the liquid suction device 2 is communicated with the foam generating cavity 4 when the second spring-type one-way valve is opened. Therefore, when the first spring-type one-way valve 23 and the second spring-type one-way valve 24 are closed, the liquid suction device 2 may be completely closed, so that a fluid in the liquid suction device 2 may be completely isolated from the outside when not in use, and thus drying up may be avoided. The liquid suction device 2 may be a liquid pump. When the fluid in the liquid pump is not in use, internal and external pressures of the liquid pump are the same, so that the pressure valve is closed, and the liquid pump is completely isolated from the outside, and thus drying up is avoided. When the liquid pump starts to operate, a pressure difference caused by the liquid pump pushes the pressure valve to open, and the fluid in the liquid pump is communicated with the outside to deliver the foaming liquid.

The water adding device 5 may be a water pump. The water tank 6 is communicated with the foam generating cavity 4 through a first water adding pipeline 51, the water adding device 5, and a second water adding pipeline 52 in turn. The water adding device 5 sucks water from the water tank 6 through the first water adding pipeline 51 and supplies water to the foam generating cavity 4 through the second water adding pipeline 52. A third spring-type one-way valve 53 is fixedly arranged in the second water adding pipeline 52. A flow direction of the third spring-type one-way valve 53 is from the water adding device 5 to the foam generating cavity 4. The water adding device 5 is isolated from the foam generating cavity 4 when the third spring-type one-way valve 53 is closed, and the water adding device 5 is communicated with the foam generating cavity 4 when the third spring-type one-way valve 53 is opened. Therefore, when the water pump does not operate, the third spring-type one-way valve 53 stably blocks the water adding passage under the action of the spring of the one-way valve, thus avoiding the liquid from flowing into other passages.

The air input device 7 may be an air pump. The air input device 7 sucks the ambient air and outputs the air through an air inlet pipeline 71 from an air inlet 73, thus supplying the air to the foam generating cavity 4. A fourth spring-type one-way valve 72 is fixedly arranged in the air inlet pipeline 71. A flow direction of the fourth spring-type one-way valve 72 is from the air input device 7 to the foam generating cavity 4. The air input device 7 is isolated from the foam generating cavity 4 when the fourth spring-type one-way valve 72 is closed, and the air input device 7 is communicated with the foam generating cavity 4 when the fourth spring-type one-way valve 72 is opened. Therefore, when the air pump does not operate, the fourth spring-type one-way valve 72 stably blocks the air inlet channel under the action of the spring of the one-way valve, thus avoiding the liquid from flowing into other passages.

Through the above mode and the structure capable of generating two or more sizes of foams, and without affecting the use function, large foams are partially used instead of small foams. Thus, the foaming liquid may be saved and the maintenance frequency may be reduced.

For example, two foam sizes are sprayed. According to the foam sizes, the foams with large foam size are defined as large foams, and the foams with small foam size are defined as small foams. The controller 1 controls the volume of the foaming liquid pump during one foam spraying process.

When spraying small foams, the controller 1 controls the liquid pump to pump out foaming liquid with a volume V1 in one foam spraying process.

When spraying large foams, the controller 1 controls the liquid pump to pump out foaming liquid with volume V2 in one foam spraying process, wherein V2 is smaller than V1.

In one embodiment, a power supply end of the water adding device 5 is electrically connected with a second switching power supply 1002, and the controller 1 is communicated with the second switching power supply 1002; and/or
    a power supply end of the air input device 7 is electrically connected with a third switching power supply 1003, and the controller 1 is communicated with the third switching power supply 1003.

The controller 1 is communicated with the second switching power supply 1002 or the third switching power supply 1003 by wired or wireless means, the second switching power supply 1002 is electrically connected with the power supply end of the water adding device 5, and the third switching power supply 1003 is electrically connected with the power supply end of the air intake device 7. The controller 1 controls the second switching power supply 1002 and/or the third switching power supply 1003 to turn on or off and controls the second switching power supply 1002 and/or the third switching power supply 1003 to output power supply with different duty ratios through different signals output to the second switching power supply 1002 and/or the third switching power supply 1003. The second switching power supply 1002 and the third switching power supply 1003 may be Pulse Width Modulation (PWM) power supplies.

The second switching power supply 1002 changes the duty ratio of the output power supply according to different level signals input by the controller 1. The larger the duty ratio, the longer the duration of the high level per unit time, and the longer the opening time of the water adding device 5, so that the volume of the water supplied to the foam generating cavity 4 will increase. The smaller the duty ratio, the shorter the duration of the high level per unit time, and the shorter the opening time of the water adding device 5, so that the volume of the water supplied to the foam generating cavity 4 will be smaller. The different volume of the water may change the size structure of the foam.

The third switching power supply 1003 changes the duty ratio of the output power supply according to different level signals input by the controller 1. The larger the duty ratio, the longer the duration of the high level per unit time, and the longer the opening time of the air input device 7, so that the air supplied to the foam generating cavity 4 will increase. The smaller the duty ratio, the shorter the duration of the high level per unit time, and the shorter the opening time of the air input device 7, so that the air supplied to the foam generating cavity 4 will be smaller. The different supply amount of the air may change the size structure of the foam.

Therefore, by adopting the above mode, different volumes of foaming liquids can be pumped out by controlling the liquid pump in the foaming process, thereby generating foams with different sizes.

The present disclosure provides a toilet, comprising a toilet body and the toilet foam generating mechanism with adjustable foam size as described above, wherein the toilet foam generating mechanism is fixed in the toilet body and the foam spray nozzle 9 faces a toilet surface 10. The controller 1 executes all steps of the control method for spraying foam by the toilet as described above.

Ninth Embodiment: A Control Method for Spraying Foam by a Toilet

Figure 6:
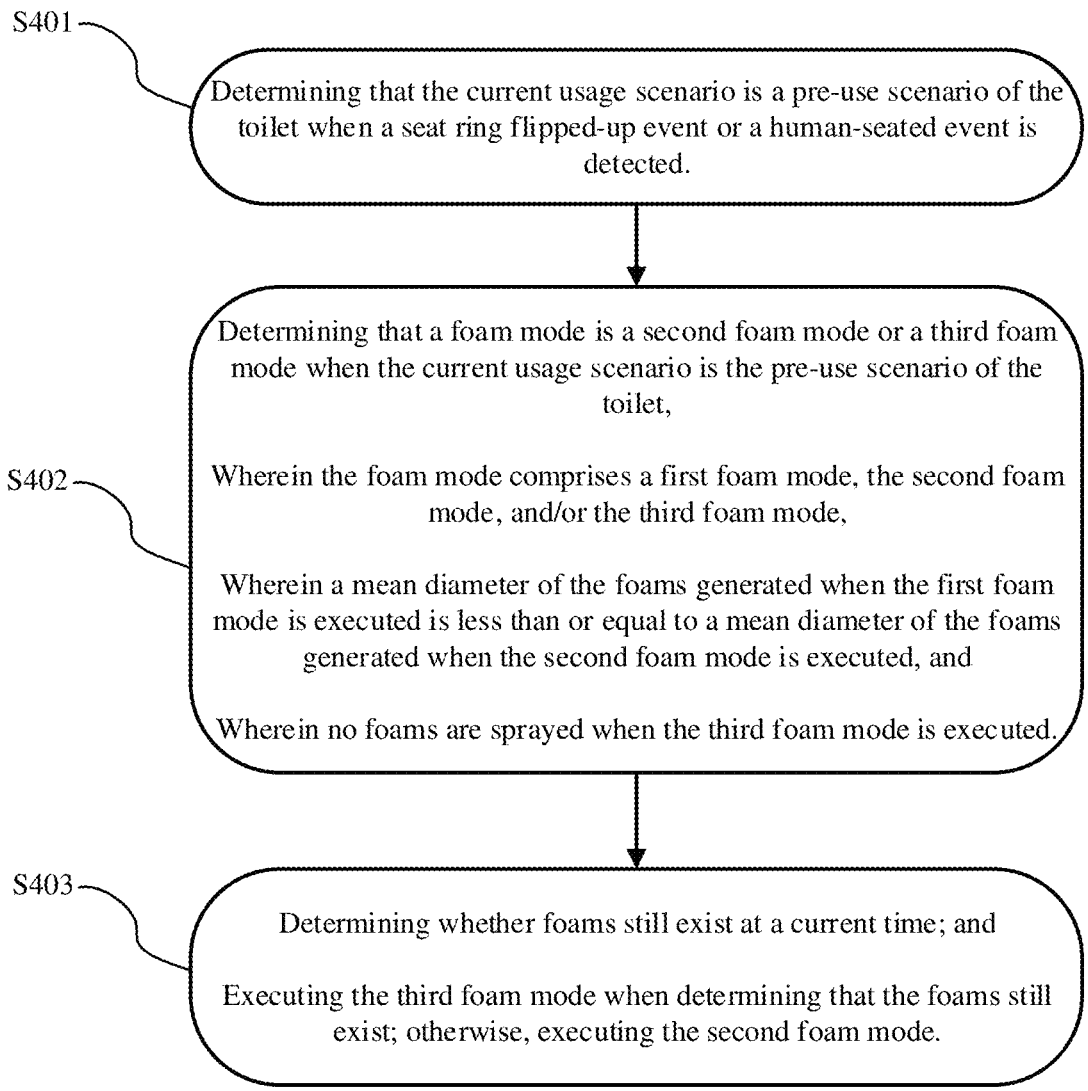
FIG. 6 is a workflow chart of a control method for spraying foam by a toilet according to another embodiment of the present disclosure.

FIG. 6 is a working flowchart of a control method for spraying foam by a toilet according to another embodiment of the present disclosure.

The method comprises step S401: determining that the current usage scenario is a pre-use scenario of the toilet when a seat ring flipped-up event or a human-seated event is detected.

The method further comprises step S402: determining that a foam mode is a second foam mode or a third foam mode when the current usage scenario is the pre-use scenario of the toilet,
    wherein the foam mode comprises a first foam mode, the second foam mode, and/or the third foam mode,
    wherein a mean diameter of the foams generated when the first foam mode is executed is less than or equal to a mean diameter of the foams generated when the second foam mode is executed, and
    wherein no foams are sprayed when the third foam mode is executed.

The method further comprises step S403: determining whether foams still exist at a current time; and
    executing the third foam mode when determining that the foams still exist; otherwise, executing the second foam mode.

In one embodiment, determining that the foams still exist at the current time comprises:

taking a last execution time of the first foam mode as a first execution time, and taking a last execution time of the second foam mode as a second execution time;

if the seat ring flipped-up event is detected:

when the first execution time is within a first execution time threshold before the current time and no flushing is performed in the first execution time threshold before the current time, or when the second execution time is within a second execution time threshold before the current time and no flushing is performed in the second execution time threshold before the current time, determining that the foams still exist at a current time; otherwise, determining that no foams exist at the current time; and if the human-seated event is detected:

when the first execution time is within a third execution time threshold before the current time and no flushing is performed in the third execution time threshold before the current time, or when the second execution time is within a fourth execution time threshold before the current time and no flushing is performed in the fourth execution time threshold before the current time, determining that the foams still exist at a current time; otherwise, determining that no foams exist at the current time.

Specifically, in order to reduce the consumption of the foaming liquid, the toilet is provided with two or more foam sizes:

1. When it is predicted that the toilet is unused for a long time, the first foam mode is employed to spray smaller foams in this case to maintain a longer life of the foam.
2. Before the toilet is used or when the toilet is frequently used, the second foam mode is employed to spray larger foams, which only prevents splashing water.
3. When the toilet is used very frequently, the toilet is mainly cleaned by flushing, then the third foam mode is employed, without spraying foams automatically.

At step S401, the pre-use scenario of the toilet is determined as the current usage scenario when the seat ring flipped-up event or the human-seated event is detected. The seat ring flipped-up event or the human-seated event may be detected by various existing sensors. For example, the event may be detected by an infrared sensor or a pressure sensor. When it is determined that the current usage scenario is the pre-use scenario use of the toilet, the foam mode is determined as the second foam mode or the third foam mode in step S402. Then, it is determined whether foams exist in the toilet in step S403, and the foam mode is finally determined according to the foam condition. If there are foams, there is no need to add foams, and the third foam mode is employed, and if there are no foams, the second foam mode is executed.

The specific determining of whether the foams exist in the toilet may be detected by means of an infrared sensor, for example.

Considering that the foam has a certain life, the foam is determined according to the time in this embodiment. The last execution time of the first foam mode is taken as the first execution time, and the last execution time of the second foam mode is taken as the second execution time. According to different detected events, the same or different time thresholds are employed.

Specifically, if the seat ring flipped-up event is detected, corresponding to a man standing in front of a urination, it is determined that there are two situations in which the foams exist at the current time:

1. If the first execution time is within the first execution time threshold before the current time and no flushing is performed in the first execution time threshold before the current time, i.e.:

the first foam mode is executed within the first execution time threshold t1 before the current time, and no flushing is performed in the first execution time threshold t1 before the current time, it may be determined that large foams still exist by limiting the first execution time threshold t1 to be a urine splash-proof retention time of large-foam, so no flushing is performed.

2. If the second execution time is within the second execution time threshold before the current time and no flushing is performed in the second execution time threshold before the current time, i.e.:

the second foam mode is executed within the second execution time threshold t2 before the current time, and no flushing is performed in the second execution time threshold t2 before the current time, it may be determined that small foams still exist by limiting the second execution time threshold t2 to be a urine splash-proof retention time of small-foam, so no flushing is performed.

When the seat ring flipped-up event is detected, it is determined that no foams exist at the current time except the above two situations.

If it is detected that the human body is seated, it is determined that there are two situations in which the foams exist at the current time:

1. If the first execution time is within the third execution time threshold before the current time and no flushing is performed in the third execution time threshold before the current time, i.e.:

the first foam mode is executed within the third execution time threshold t3 before the current time, and no flushing is performed in the third execution time threshold t3 before the current time, it may be determined that large foams still exist by limiting the third execution time threshold t3 to be a stool splash-proof retention time of large-foam, so no flushing is performed.

2. If the second execution time is within the fourth execution time threshold before the current time and no flushing is performed in the fourth execution time threshold before the current time, i.e.:

the second foam mode is executed within the fourth execution time threshold t4 before the current time, and no flushing is performed in the fourth execution time threshold t4 before the current time, it may be determined that small foams still exist by limiting the fourth execution time threshold t4 to be a stool splash-proof retention time of small-foam, so no flushing is performed.

When it is detected that the human body is seated, it is determined that no foams exist at the current time except the above two situations.

This embodiment accurately determines the usage scenario of the toilet according to the seat ring flipped-up event or the human-seated event, thereby adopting an appropriate foam mode and reducing the consumption of the foaming liquid. Meanwhile, it is determined whether the foams still exist in the toilet according to the execution time of the foam mode, so as to further reduce the consumption of the foaming liquid.

Figure 7:
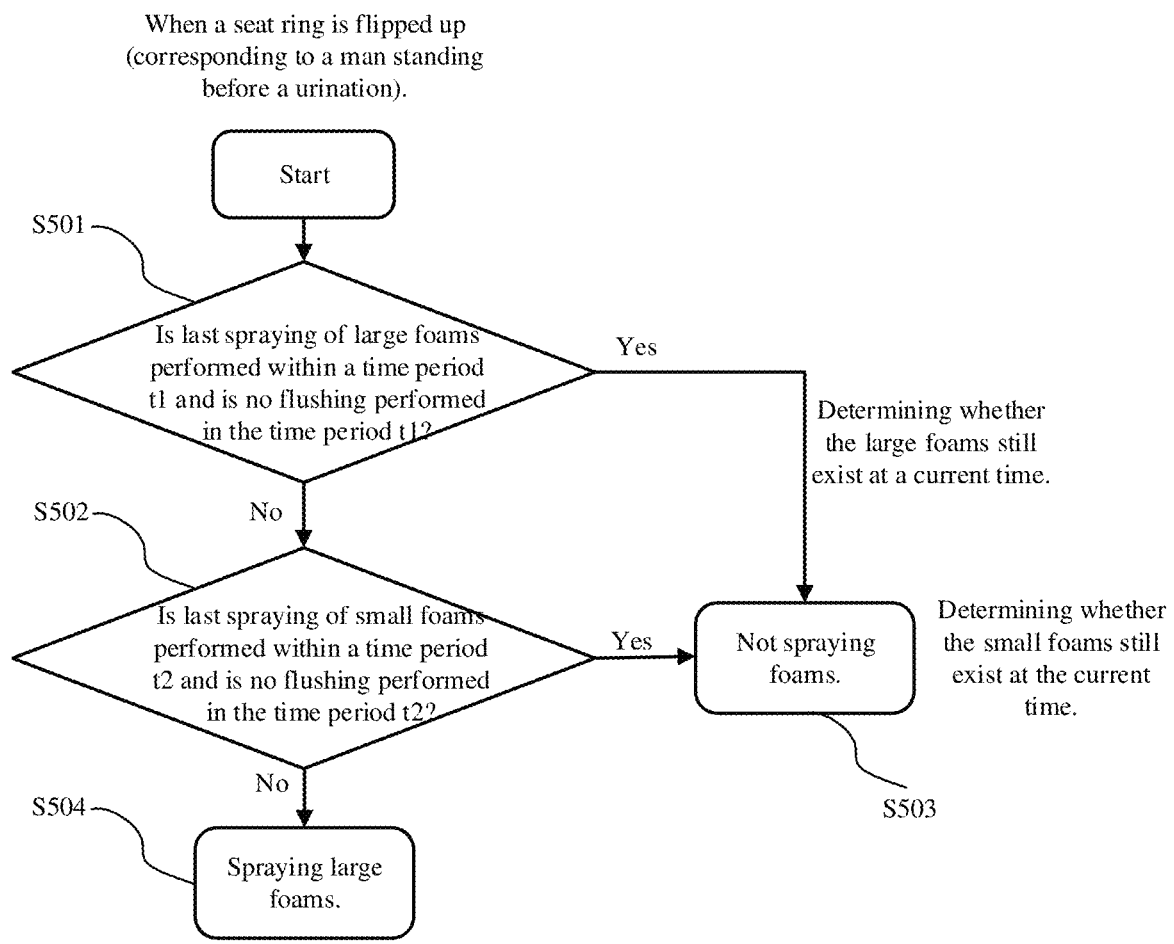
FIG. 7 is a workflow chart of the control method for spraying foam by the toilet according to an embodiment of the present disclosure when a seat ring is flipped up, which corresponds to a man standing before a urination.

As an example, FIG. 7 shows a workflow chart of the control method for spraying foam by the toilet according to an embodiment of the present disclosure when a seat ring is flipped up, which corresponds to a man standing before a urination.

The method comprises, at step S501, determining whether last spraying of large foams is performed within a time period t1 and no flushing is performed in the time period t1. If Yes in S501, no foams are sprayed at S503. If No in S501, step S502 is executed.

The method further comprises, at step S502, determining whether last spraying of small foams is performed within a time period t2. If Yes in S502, no flushing is performed in the time period t2, no foams are sprayed. If No in S502, large foams are sprayed at S504.

Specifically, t1 is a urine splash-proof retention time of large-foam, which may be 1 hour, while t2 is a urine splash-proof retention time of small-foam, which may be 3 hours.

At step S501, it is determined whether large foams still exist; and no foams are sprayed when the large foams still exist. At step S502, it is determined whether small foams still exist; and no foams are sprayed when the small foams still exist; otherwise, there is no need for small foams because men immediately flush after urinating, and only large foams are needed to prevent splashing.

Figure 8:
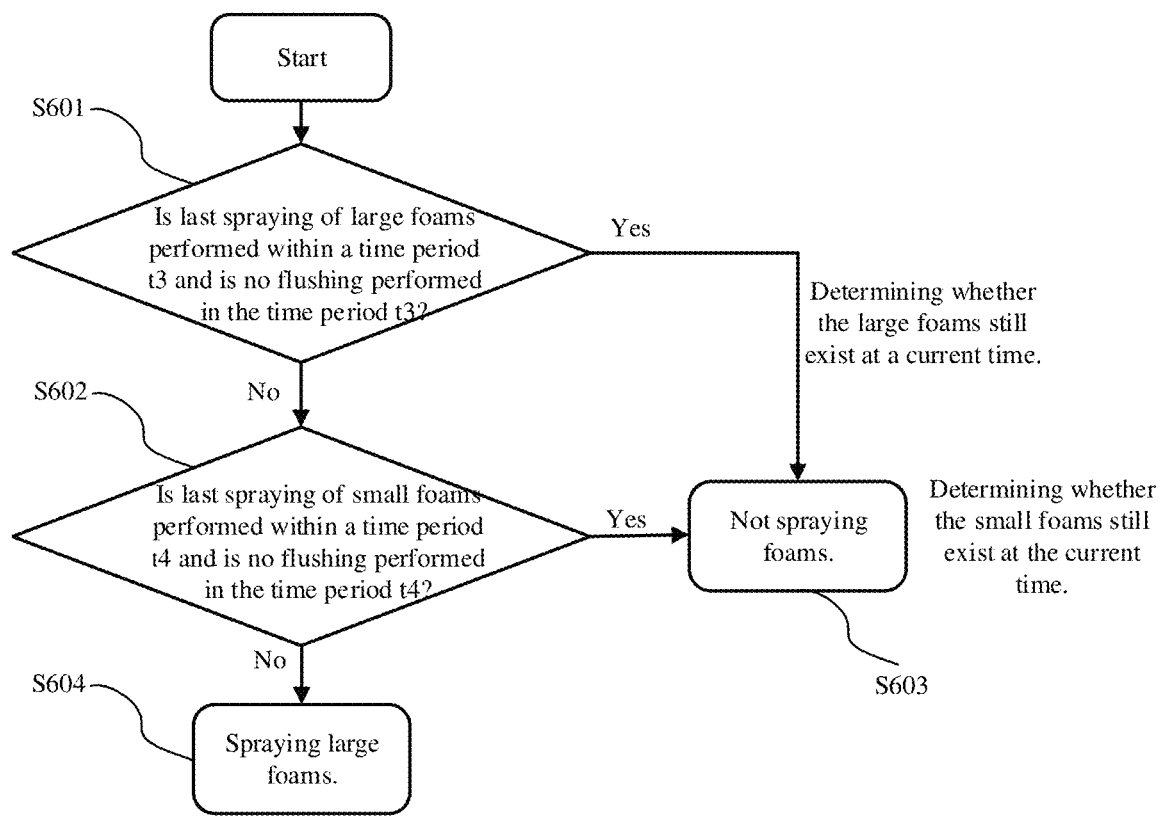
FIG. 8 is a workflow chart of the control method for spraying foam by a toilet according to an embodiment of the present disclosure when the human body is seated.

As an example, FIG. 8 shows a workflow chart of the control method for spraying foam by the toilet according to an embodiment of the present disclosure when the human is seated.

The method comprises, at step S601, determining whether last spraying of large foams is performed within a time period t3 and no flushing is performed in the time period t3. If Yes in S601, no foams are sprayed at S603. If No in S601, step S602 is executed.

The method further comprises, at step S602, determining whether last spraying of small foams is performed within a time period t4 and no flushing is performed in the time period t4. If Yes in S602, no foams are sprayed. If No in S602, large foams are sprayed at S604.

Specifically, t3 is a stool splash-proof retention time of large-foam, which may be 0.5 hour, while t4 is a stool splash-proof retention time of small-foam, which may be 2 hours.

At step S601, it is determined whether large foams still exist; and no foams are sprayed when the large foams still exist. At step S602, it is determined whether small foams still exist; and no foams are sprayed when the small foams still exist; because flushing may be performed immediately after being seated, there is no need for small foams and only large foams are needed to prevent splashing.

Tenth Embodiment: A Control Method for Spraying Foam by a Toilet

Figure 9:
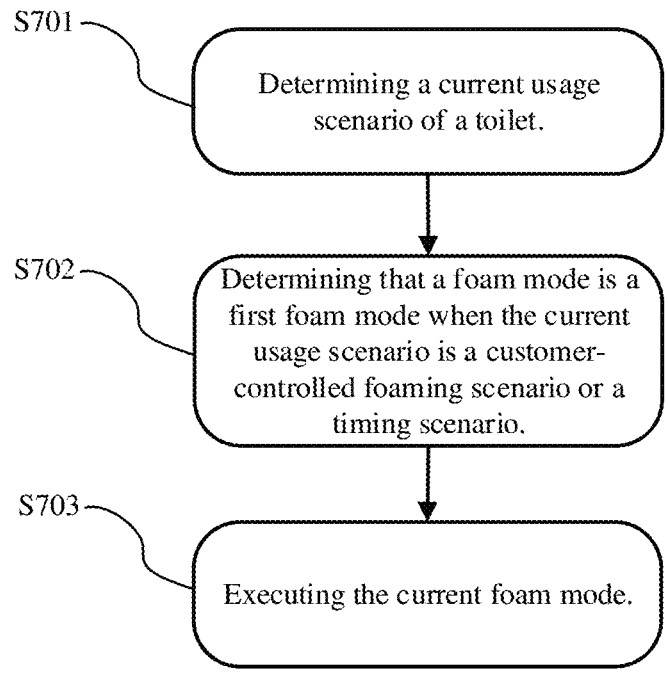
FIG. 9 is a workflow chart of a control method for spraying foam by a toilet according to another embodiment of the present disclosure.

FIG. 9 is a working flowchart of a control method for spraying foam by a toilet according to another embodiment of the present disclosure.

The method comprises step S701: determining a current usage scenario of the toilet.

The method further comprises step S702: determining that a foam mode is a first foam mode when the current usage scenario is a customer-controlled foaming scenario or a timing scenario,
wherein the foam mode comprises the first foam mode, the second foam mode, and/or the third foam mode, wherein a mean diameter of foams generated when the first foam mode is executed is less than or equal to a mean diameter of foams generated when the second foam mode is executed, and
wherein no foams are sprayed when the third foam mode is executed.

The method further comprises step S703: executing the current foam mode.

Specifically, when the customer controls foaming or foaming is performed at a regular time, the first foam mode is employed to generate small foams.

Eleventh Embodiment: An Electronic Device for Executing the Control Methods for Spraying Foam by the Toilet of the Seventh to Tenth Embodiments FIG. 13 a schematic diagram of a hardware structure of an electronic device according to the present disclosure, comprising:
at least one processor 1101; and,
a memory 1102 communicated with the at least one processor 1101; wherein,
the memory 1102 stores instructions that can be executed by the at least one processor, and the instructions are executed by the at least one processor, so that the at least one processor can execute the control method for spraying foam by the toilet as described above.

Figure 13:
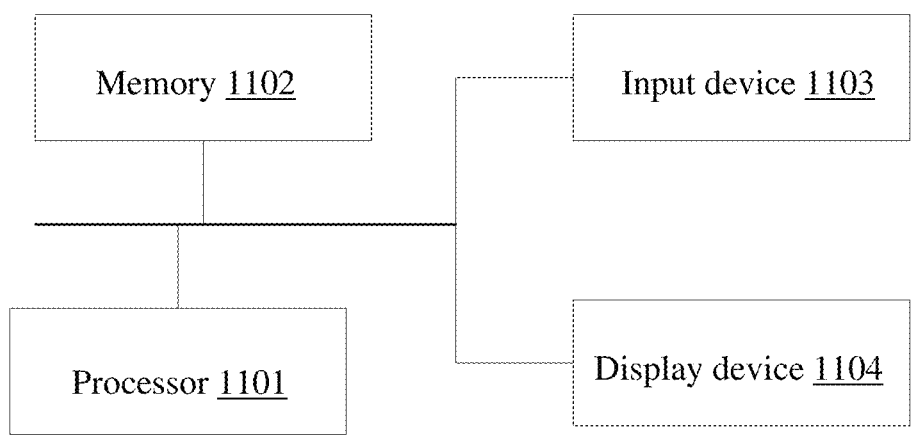
FIG. 13 is a schematic diagram of a hardware structure of an electronic device according to the present disclosure.

In FIG. 13, one processor 1101 is taken as an example.

The electronic device may also comprise: an input device 1103 and a display device 1104.

The processor 1101, the memory 1102, the input device 1103, and the display device 1104 may be connected via a bus or other ways. In this figure, bus connection is taken as an example.

As a non-volatile computer-readable storage medium, the memory 1102 may be used to store non-volatile software programs, non-volatile computer executable programs and modules, such as program instructions/modules corresponding to the control method for spraying foam by the toilet according to the embodiments of the present disclosure, for example, the method flows shown in FIG. 3-FIG. 9. The processor 1101 executes various functional applications and data processing by running the non-volatile software programs, instructions and modules stored in the memory 1102, i.e., realizes the control method for spraying foam by the toilet in the above embodiments.

The memory 1102 may comprise a program storage area and a data storage area, wherein the program storage area may store application programs required by an operating system and at least one function. The data storage area may store data and the like created according to the use of the control method for spraying foam by the toilet. In addition, the memory 1102 may comprise a high-speed random access memory and may also include a non-volatile memory, such as at least one disk memory device, a flash memory device, or other non-volatile solid storage devices. In some embodiments, the memory 1102 may optionally comprise memories remotely located with respect to the processor 1101, which may be connected via networks to an apparatus for executing the control method for spraying foam by the toilet. Examples of the networks above comprise, but are not limited to, the Internet, intranet, local area networks, mobile communication networks, and combinations thereof.

The input device 1103 may be configured to receive input user click, as well as generate signal inputs related to user settings and function control of the control method for spraying foam by the toilet. The display device 1104 may comprise a display screen and other display devices.

When the one or more modules are stored in the memory 1102 and run by the one or more processors 1101, the control method for spraying foam by the toilet in any of the above-mentioned method embodiments is executed.

The present disclosure executes different foam modes according to different usage scenarios of the toilet. Foaming methods are set reasonably to adapt to different application scenarios. Without affecting the use function, large foams are partially used instead of small foams, and thus the foaming liquid may be saved and the maintenance frequency may be reduced.

One embodiment of the present disclosure provides a storage medium, wherein the storage medium stores computer instructions which, when executed by a computer, are used to execute all steps of the control method for spraying foam by the toilet as described above.

The above embodiments merely express several embodiments of the present disclosure, and the descriptions thereof are more specific and detailed, but these embodiments cannot be understood as a limitation to the scope of the present disclosure. It should be noted that those of ordinary skills in the art may make a plurality of variants and improvements without departing from the concept of the present disclosure, and these variants and improvements shall all fall within the protection scope of the present disclosure. Therefore, the protection scope of the disclosure patent should be subjected to the claims appended.

The present disclosure will be further described in detail hereinafter with reference to the accompanying drawings and the specific embodiments.

Figure 14:
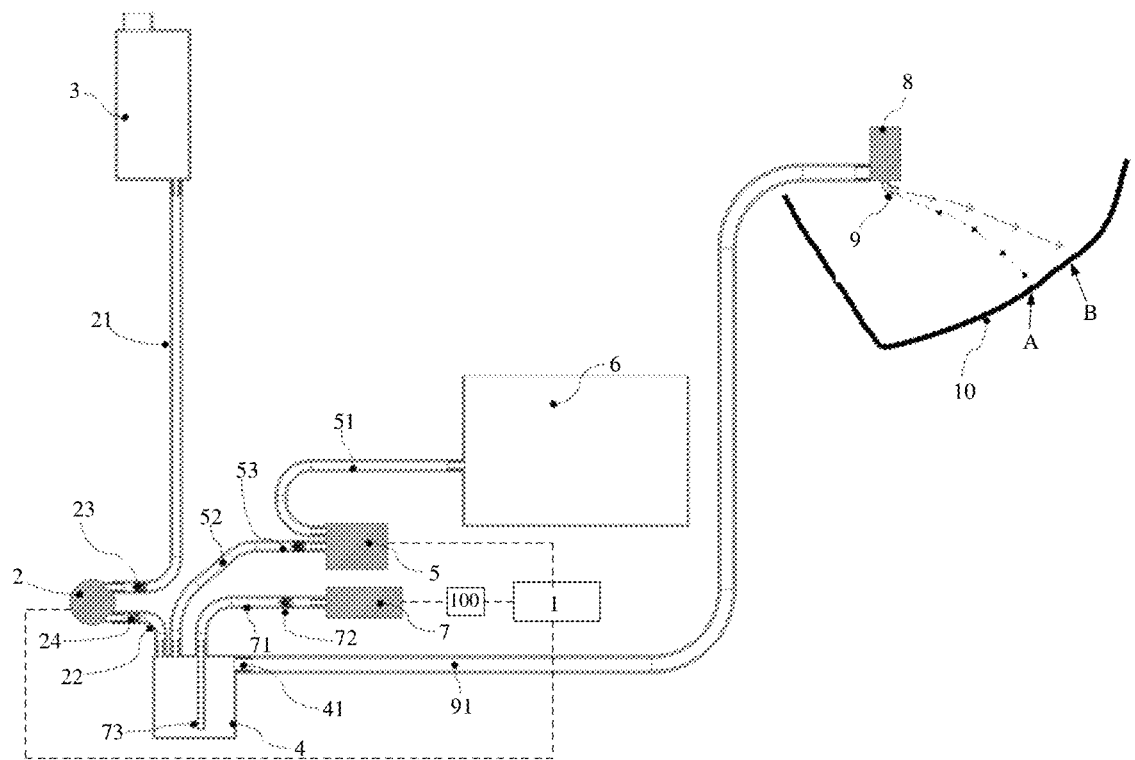
FIG. 14 is a schematic structure diagram of a toilet foam generating mechanism with adjustable foam range according to the present disclosure.

Twelfth Embodiment: A Toilet Foam Generating Mechanism with Adjustable Foam Range FIG. 14 shows a toilet foam generating mechanism with adjustable foam range according to the present disclosure, comprising: a foaming liquid adding passage, a water adding passage, an air inlet channel, a foam generating cavity 4, a foam spray nozzle 9, and a controller 1. The foaming liquid adding passage, the water adding passage and the air inlet channel are communicated with the foam generating cavity 4, the foam spray nozzle 9 is communicated with a foam outlet 41 of the foam generating cavity 4, the air inlet channel comprises an air input device 7 communicated with the foam generating cavity 4 and a switching power supply 100 electrically connected with a power supply end of the air input device 7, and the switching power supply 100 is communicated with the controller 1.

Figure 15:
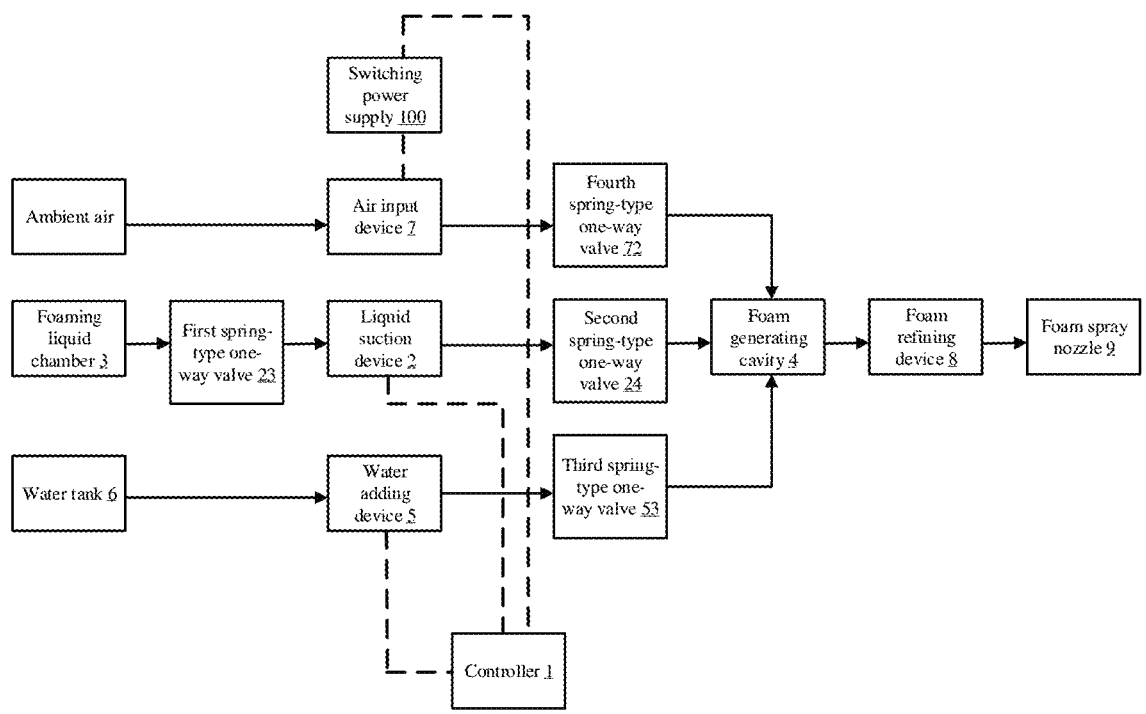
FIG. 15 is a system connection diagram of a toilet foam generating mechanism with adjustable foam range according to an embodiment of the present disclosure.

Specifically, as shown in FIG. 14 and FIG. 15, the foaming liquid adding passage supplies a foaming liquid to the foam generating cavity 4, the water adding passage supplies water to the foam generating cavity 4, and the air inlet channel supplies air to the foam generating cavity 4, so that foams are generated in the foam generating cavity 4. The foams are squeezed out of the foam generating cavity 4, flow through a foam spray pipeline 91 from the foam outlet 41 to the foam spray nozzle 9, are sprayed from the foam spray nozzle 9, and then enter a toilet surface 10.

The air inlet channel comprises the air input device 7, the power supply end of the air input device 7 is electrically with the switching power supply 100, the switching power supply 100 is communicated with the controller 1, and the controller 1 controls a duty ratio of power supply output by the power supply 100 to the air input device 7. Thus, air output of the air input device 7 is adjusted. The change of the air output of the air input device 7 will change an air pressure in the foam generating cavity 4 and then change a foaming range sprayed, so that the foam range is adjustable.

The switching power supply 100 is communicated with the controller 1 through wired or wireless means. The controller may be a Micro Control Unit (MCU).

According to the present disclosure, the switching power supply is controlled through the controller, thereby changing the supplied power of the air input device to change the air output of the air input device, and then changing the foam range sprayed, so that the foam range is adjustable, thus realizing overall coverage of the toilet surface by the foams. Meanwhile, the range is adjusted by adjusting the air output, rather than using water to adjust the range, which will not cause water waste.

Thirteenth Embodiment: A System Comprising the Toilet Foam Generating Mechanism with Adjustable Foam Range of the Twelfth Embodiment As shown in FIG. 14 and FIG. 15, a toilet foam generating mechanism with adjustable foam range in an embodiment of the present disclosure comprises: a foaming liquid adding passage, a water adding passage, an air inlet channel, a foam generating cavity 4, a foam spray nozzle 9, a controller 1, a switching power supply 100, and a foam refining device 8. The foaming liquid adding passage, the water adding passage, and the air inlet channel are communicated with the foam generating cavity 4. The foam spray nozzle 9 is communicated with a foam outlet 41 of the foam generating cavity 4 through the foam refining device 8. The air inlet channel comprises an air input device 7 communicated with the foam generating cavity 4, the air input device 7 is an air pump, the switching power supply 100 is electrically connected with a power supply end of the air input device 7, and the controller 1 is communicated with the switching power supply 100. In an embodiment, the switching power supply 100 is a pulse width modulation power supply.

The foaming liquid adding passage comprises: a foaming liquid box (e.g., a foaming liquid chamber) 3 and a liquid suction device 2, wherein one end of the liquid suction device 2 is communicated with the foaming liquid box 3, and the other end is communicated with the foam generating cavity 4. The liquid suction device 2 is a liquid pump.

The water adding passage comprises: a water tank 6 and a water adding device 5, wherein one end of the water adding device 5 is communicated with the water tank 6, and the other end is communicated with the foam generating cavity 4. The water adding device 5 is a water pump.

Specifically, as shown in FIG. 14 and FIG. 15, the liquid suction device 2 sucks a foaming liquid from the foaming liquid box 3 and supplies the foaming liquid to the foam generating cavity 4. The water adding device 5 sucks water from the water tank 6 and supplies the water to the foam generating cavity 4, and the air input device 7 sucks ambient air and supplies the air to the foam generating cavity 4, so that foams are generated in the foam generating cavity 4. The foams are squeezed out of the foam generating cavity 4, flow through a foam spray pipeline 91 from the foam outlet 41 to the foam refining device 8, are refined by the foam refining device 8, sprayed from the foam spray nozzle 9, and then enter a toilet surface 10. The foam refining device 8 is a dispensing motor.

The liquid suction device 2 and the water adding device 5 may be communicated with the controller 1 by wired or wireless means and are controlled to be opened or closed by the controller 1. The dotted lines in FIG. 14 and FIG. 15 are communication lines or electrical connection lines.

Figure 12:
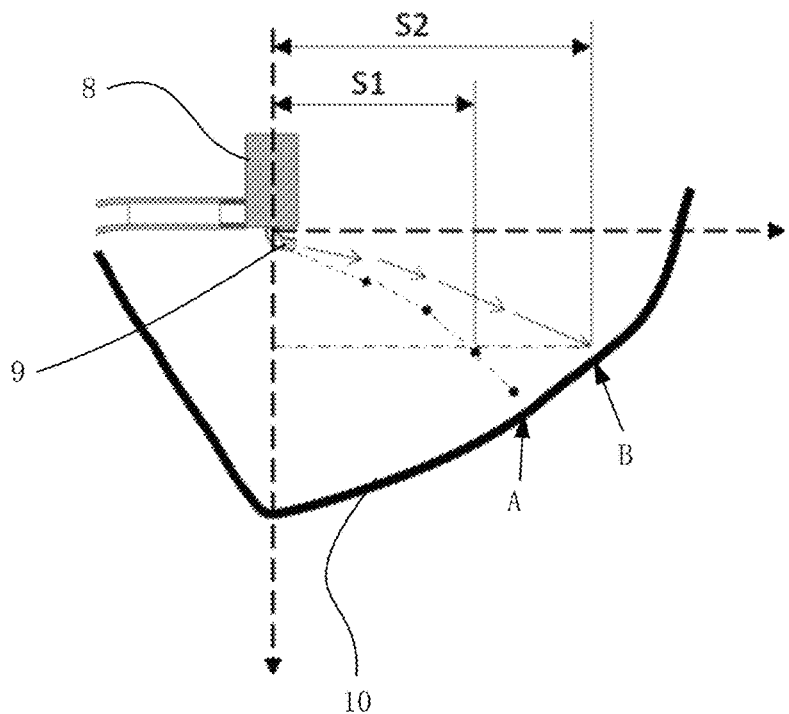
FIG. 12 is a schematic diagram of foam range adjustment of a toilet foam generating mechanism with adjustable foam size according to an embodiment of the present disclosure.

Meanwhile, the controller 1 is communicated with the switching power supply 100 by wired or wireless means, and the switching power supply 100 is electrically connected with the power supply end of the air input device 7. The controller 1 controls the switching power supply 100 to turn on or off and controls the switching power supply 100 to output power supply with different duty ratios through different signals output to the switching power supply 100. The switching power supply 100 may be a Pulse Width Modulation (PWM) power supply. The switching power supply 100 changes the duty ratio of the output power supply according to different level signals input by the controller 1. The duty ratio is a ratio of a period time occupied by a high level to a whole period time, so the duration of the high level varies with the duty ratio. The larger the duty ratio, the longer the duration of the high level per unit time, and the longer the opening time of the air input device 7, so that the air output to the foam generating cavity 4 will increase. The smaller the duty ratio, the shorter the duration of the high level per unit time, and the shorter the opening time of the air input device 7, so that the air output to the foam generating cavity 4 will be smaller. When the air output of the air input device 7 changes, the foaming range sprayed will change. As shown in FIG. 14, under a first duty ratio, a falling point of the sprayed foam on the toilet surface 10 is A, and as shown in FIG. 12, under a given altitude difference, a range distance of the falling point A is S1. Under a second duty ratio, a falling point of the sprayed foam on the toilet surface 10 is B, and as shown in FIG. 12, under the given altitude difference, a range distance of the falling point B is S2.

The foaming liquid box 3 is located above the liquid suction device 2. The foaming liquid box 3 is communicated with the liquid suction device 2 through a first liquid suction pipeline 21, and the liquid suction device 2 is communicated with the foam generating cavity 4 through a second liquid suction pipeline 22. A first spring-type one-way valve 23 is fixedly arranged in first liquid suction pipeline 21, and a second spring-type one-way valve 24 is fixedly arranged in the second liquid suction pipeline 22. A flow direction of the first spring-type one-way valve 23 is from the foaming liquid box 3 to the liquid suction device 2, and a flow direction of the second spring-type one-way valve 24 is from the liquid suction device 2 to the foam generating cavity 4. The foaming liquid box 3 is isolated from the liquid suction device 2 when the first spring-type one-way valve 23 is closed, and the foaming liquid box 3 is communicated with the liquid suction device 2 when the first spring-type one-way valve 23 is opened. The liquid suction device 2 is isolated from the foam generating cavity 4 when the second spring-type one-way valve 24 is closed, and the liquid suction device 2 is communicated with the foam generating cavity 4 when the second spring-type one-way valve is opened. Therefore, when the first spring-type one-way valve 23 and the second spring-type one-way valve 24 are closed, the liquid suction device 2 may be completely closed, so that a fluid in the liquid suction device 2 may be completely isolated from the outside when not in use, and thus drying up may be avoided. The liquid suction device 2 may be a liquid pump. When the fluid in the liquid pump is not in use, internal and external pressures of the liquid pump are the same, so that the pressure valve is closed, and the liquid pump is completely isolated from the outside, and thus drying up is avoided. When the liquid pump starts to operate, a pressure difference caused by the liquid pump pushes the pressure valve to open, and the fluid in the liquid pump is communicated with the outside to deliver the foaming liquid.

The water adding device 5 may be a water pump. The water tank 6 is communicated with the foam generating cavity 4 through a first water adding pipeline 51, the water adding device 5 and a second water adding pipeline 52 in turn. The water adding device 5 sucks water from the water tank 6 through the first water adding pipeline 51 and supplies water to the foam generating cavity 4 through the second water adding pipeline 52. A third spring-type one-way valve 53 is fixedly arranged in the second water adding pipeline 52. A flow direction of the third spring-type one-way valve 53 is from the water adding device 5 to the foam generating cavity 4. The water adding device 5 is isolated from the foam generating cavity 4 when the third spring-type one-way valve 53 is closed, and the water adding device 5 is communicated with the foam generating cavity 4 when the third spring-type one-way valve 53 is opened. Therefore, when the water pump does not operate, the third spring-type one-way valve 53 stably blocks the water adding passage under the action of the spring of the one-way valve, and thus the liquid from flowing into other passages may be avoided.

The air input device 7 may be an air pump. The air input device 7 sucks the ambient air and outputs the air through an air inlet pipeline 71 from an air inlet 73 and thus supplies the air to the foam generating cavity 4. A fourth spring-type one-way valve 72 is fixedly arranged in the air inlet pipeline 71. A flow direction of the fourth spring-type one-way valve 72 is from the air input device 7 to the foam generating cavity 4. The air input device 7 is isolated from the foam generating cavity 4 when the fourth spring-type one-way valve 72 is closed, and the air input device 7 is communicated with the foam generating cavity 4 when the fourth spring-type one-way valve 72 is opened. Therefore, when the water pump does not operate, the fourth spring-type one-way valve 72 stably blocks the air inlet channel under the action of the spring of the one-way valve, thus avoiding the liquid from flowing into other passages.

According to the present disclosure, the duty ratio of the output power supply of the switching power supply is controlled through the controller, thereby changing the supplied power of the air input device to change an air output of the air input device, and then changing a foam range sprayed, so that the foam range is adjustable, thus realizing overall coverage of a toilet surface by the foams. Meanwhile, the range is adjusted by adjusting the air output, rather than using water to adjust the range, which will not cause water waste.

Fourteenth Embodiment: A Toilet Comprising the Toilet Foam Generating Mechanism with Adjustable Foam Range of the Twelfth Embodiment As shown in FIG. 14, the present disclosure provides a toilet, comprising a toilet body and the toilet foam generating mechanism with adjustable foam range as described above, wherein the toilet foam generating mechanism is fixed in the toilet body and the foam spray nozzle 9 faces a toilet surface 10.

According to the present disclosure, the switching power supply is controlled through the controller, thereby changing the supplied power of the air input device to change the air output of the air input device, and then changing the foam range sprayed, so that the foam range is adjustable, thus realizing overall coverage of the toilet surface by the foams.

Meanwhile, the range is adjusted by adjusting the air output, rather than using water to adjust the range, which will not cause water waste.

The above embodiments merely express several embodiments of the present disclosure, and the descriptions thereof are more specific and detailed, but these embodiments cannot be understood as a limitation to the patent scope of the present disclosure. It should be noted that those of ordinary skills in the art may make a plurality of variations and improvements without departing from the conception of the present disclosure, and these variations and improvements shall all fall within the protection scope of the present disclosure. Therefore, the protection scope of the patent according to the present disclosure shall be subjected to the claims appended.

I claim:

1. A toilet foam generating mechanism, comprising:
a foam generating cavity, comprising a foam outlet;
a foam spray nozzle in communication with the foam outlet; and
a foaming liquid adding passage in communication with the foam generating cavity, the foaming liquid adding passage comprising:
a foaming liquid chamber; and
a liquid suction device, comprising a first end in communication with the foaming liquid chamber and a second end in communication with the foam generating cavity, wherein a power supply end of the liquid suction device is electrically coupled to a first switching power supply;
a controller communicably coupled to the first switching power supply,
wherein the first switching power supply is a pulse width modulation power supply that generates a pulse width modulation signal defining a volume of foaming liquid pumped into the foam generating cavity
wherein a structure size of a toilet foam being generated is adjustable between a large structure size and a small structure size.

2. The toilet foam generating mechanism according to claim 1, wherein the liquid suction device is a liquid pump.

3. The toilet foam generating mechanism according to claim 1, further comprising a water adding passage in communication with the foam generating cavity,
wherein the water adding passage comprises:
a water tank; and
a water adding device, comprising a first end in communication with the water tank and a second end in communication with the foam generating cavity.

4. The toilet foam generating mechanism according to claim 3, wherein the water adding device is a water pump.

5. The toilet foam generating mechanism according to claim 3,
wherein a power supply end of the water adding device is electrically coupled to a second switching power supply, and
wherein the controller is communicably coupled to the second switching power supply.

6. The toilet foam generating mechanism according to claim 5, further comprising an air inlet channel in communication with the foam generating cavity,
wherein the air inlet channel comprises an air input device in communication with the foam generating cavity.

7. The toilet foam generating mechanism according to claim 6, wherein the air input device is an air pump.

8. The toilet foam generating mechanism according to claim 6,
wherein a power supply end of the air input device is electrically coupled to a third switching power supply, and
wherein the controller is communicably coupled to the third switching power supply.

9. A toilet, comprising:
a toilet body, comprising a toilet surface; and
a toilet foam generating mechanism disposed in the toilet body, the toilet foam generating mechanism comprising:
a foam generating cavity, comprising a foam outlet;
a foam spray nozzle in communication with the foam outlet and facing the toilet surface; and
a foaming liquid adding passage in communication with the foam generating cavity, the foaming liquid adding passage comprising:
a foaming liquid chamber; and
a liquid suction device, comprising a first end in communication with the foaming liquid chamber and a second end in communication with the foam generating cavity, wherein a power supply end of the liquid suction device is electrically coupled to a first switching power supply; and
a controller communicably coupled to the first switching power supply,
wherein the first switching power supply generates a pulse width modulation signal defining a volume of foaming liquid pumped into the foam generating cavity is associated with a structure size of a toilet foam being generated is adjustable between a small size and a large size.

10. The toilet according to claim 9,
wherein the toilet foam generating mechanism further comprises a water adding passage in communication with the foam generating cavity,
wherein the water adding passage comprises:
a water tank; and
a water adding device, comprising a first end in communication with the water tank and a second end in communication with the foam generating cavity.

11. The toilet according to claim 10,
wherein a power supply end of the water adding device is electrically coupled to a second switching power supply, and
wherein the controller is communicably coupled to the second switching power supply and the first switching power supply.

12. The toilet according to claim 9,
wherein the toilet foam generating mechanism further comprises an air inlet channel in communication with the foam generating cavity,
wherein the air inlet channel comprises an air input device in communication with the foam generating cavity.

13. The toilet according to claim 12,
wherein a power supply end of the air input device is electrically coupled to a third switching power supply, and
wherein the controller is communicably coupled to the third switching power supply and the first switching power supply.

14. A toilet foam generating mechanism, comprising:
a foam generating cavity, comprising a foam outlet; and
a foaming liquid adding passage in communication with the foam generating cavity, the foaming liquid adding passage comprising:
a foaming liquid chamber; and a liquid suction device, comprising a first end in communication with the foaming liquid chamber and a second end in communication with the foam generating cavity, wherein a power supply end of the liquid suction device is electrically coupled to a first switching power supply; and a controller communicably coupled to the first switching power supply, wherein the first switching power supply generates a pulse width modulation signal defining a volume of foaming liquid pumped into the foam generating cavity wherein a structure size of a toilet foam being generated is adjustable between a large structure size and a small structure size.

* * * * *